(12) United States Patent
Hildreth

(10) Patent No.: US 9,986,293 B2
(45) Date of Patent: May 29, 2018

(54) DEVICE ACCESS CONTROL

(75) Inventor: Evan Hildreth, Ottawa (CA)

(73) Assignee: QUALCOMM Incorporated, San Diego, CA (US)

( * ) Notice: Subject to any disclaimer, the term of this patent is extended or adjusted under 35 U.S.C. 154(b) by 461 days.

(21) Appl. No.: 12/275,297

(22) Filed: Nov. 21, 2008

(65) Prior Publication Data

US 2009/0133051 A1 May 21, 2009

Related U.S. Application Data

(60) Provisional application No. 60/989,787, filed on Nov. 21, 2007, provisional application No. 61/080,743, filed on Jul. 15, 2008.

(51) Int. Cl.
| | |
|---|---|
| *H04N 21/475* | (2011.01) |
| *H04N 5/44* | (2011.01) |
| *H04N 5/445* | (2011.01) |
| *H04N 21/4223* | (2011.01) |
| *H04N 21/45* | (2011.01) |
| *H04N 21/485* | (2011.01) |

(52) U.S. Cl.
CPC ....... *H04N 21/4755* (2013.01); *H04N 5/4403* (2013.01); *H04N 5/44543* (2013.01); *H04N 21/4223* (2013.01); *H04N 21/4532* (2013.01); *H04N 21/485* (2013.01)

(58) Field of Classification Search
CPC ............... H04N 21/4532; H04N 7/163; H04N 21/4542; H04N 21/4755; H04N 21/454; H04N 7/166; H04N 7/167; H04N 7/1675; H04N 7/169; H04N 7/1693; H04N 7/1696; H04N 7/171; H04N 7/1713; H04N 7/1716; H04N 21/4223; H04N 21/44218; H04N 21/42201; H04N 21/42203; G06Q 20/35785
USPC ................................ 725/9–10, 28; 382/118
See application file for complete search history.

(56) References Cited

U.S. PATENT DOCUMENTS

| | | | |
|---|---|---|---|
| 5,550,928 | A | 8/1996 | Lu et al. |
| 6,091,886 | A | 7/2000 | Abecassis |

(Continued)

FOREIGN PATENT DOCUMENTS

| | | | |
|---|---|---|---|
| CN | 1460371 A | 12/2003 | |
| CN | 1663265 A | 8/2005 | |

(Continued)

OTHER PUBLICATIONS

J, Hayashi, M. Yasumoto, H, Ito, and H, Koshimizu, A Method for Estimating and Modeling Age and Gender using Facial Image Processing, Proceedings of the Seventh International Conference on Virtual Syatems and Multimedia (VSMM' 01), section 4-section 5.3.*

(Continued)

*Primary Examiner* — Benjamin R Bruckart
*Assistant Examiner* — Anthony Bantamoi

(57) ABSTRACT

Access to an electronic media device may be controlled based on media settings of users experiencing content using the electronic media device. Users or attributes of the users experiencing content using the electronic media device may be automatically identified and access to the electronic media device may be automatically controlled based on media settings associated with the identified users and/or attributes.

27 Claims, 18 Drawing Sheets

(56) References Cited

U.S. PATENT DOCUMENTS

| | | | |
|---|---|---|---|
| 6,700,999 B1 | 3/2004 | Yang | |
| 6,772,192 B1 | 8/2004 | Fulton et al. | |
| 6,850,252 B1 | 2/2005 | Hoffberg | |
| 7,131,132 B1* | 10/2006 | Gehlot et al. | 725/10 |
| 7,134,130 B1 | 11/2006 | Thomas | |
| 7,224,835 B2 | 5/2007 | Maeda et al. | |
| 7,260,823 B2 | 8/2007 | Schlack et al. | |
| 7,319,779 B1* | 1/2008 | Mummareddy et al. | 382/118 |
| 7,818,763 B2* | 10/2010 | Sie et al. | 725/32 |
| 7,987,147 B2 | 7/2011 | Ohtani et al. | |
| 2002/0046100 A1 | 4/2002 | Kinjo | |
| 2002/0146168 A1 | 10/2002 | Lee et al. | |
| 2003/0052789 A1 | 3/2003 | Colmenarez et al. | |
| 2003/0072470 A1 | 4/2003 | Lee | |
| 2003/0088832 A1* | 5/2003 | Agostinelli | G06Q 30/02 715/273 |
| 2003/0093200 A1* | 5/2003 | Gutta et al. | 701/45 |
| 2003/0227439 A1 | 12/2003 | Lee et al. | |
| 2003/0231788 A1 | 12/2003 | Yukhin et al. | |
| 2004/0117786 A1 | 6/2004 | Kellerman et al. | |
| 2004/0169587 A1* | 9/2004 | Washington | G06K 7/10079 340/573.1 |
| 2006/0136962 A1 | 6/2006 | Masaki | |
| 2006/0140219 A1* | 6/2006 | Kawasaki | G11B 20/00159 370/487 |
| 2006/0158307 A1 | 7/2006 | Lee et al. | |
| 2006/0170767 A1 | 8/2006 | Brassil | |
| 2006/0184800 A1* | 8/2006 | Rosenberg | 713/186 |
| 2006/0204058 A1 | 9/2006 | Kim et al. | |
| 2007/0014439 A1 | 1/2007 | Ando | |
| 2007/0036398 A1 | 2/2007 | Chen | |
| 2007/0076119 A1* | 4/2007 | Li | H04N 5/44543 348/460 |
| 2007/0126884 A1* | 6/2007 | Xu | G06K 9/00221 348/220.1 |
| 2007/0140532 A1 | 6/2007 | Goffin | |
| 2007/0220552 A1 | 9/2007 | Juster et al. | |
| 2007/0236588 A1* | 10/2007 | Shibazaki | 348/272 |
| 2008/0016544 A1* | 1/2008 | Lee | H04N 7/163 725/134 |
| 2008/0158435 A1* | 7/2008 | Yu | G08C 17/00 348/734 |
| 2009/0138805 A1 | 5/2009 | Hildreth | |
| 2009/0240355 A1 | 9/2009 | Buil et al. | |
| 2013/0329966 A1 | 12/2013 | Hildreth | |

FOREIGN PATENT DOCUMENTS

| | | |
|---|---|---|
| CN | 1735150 A | 2/2006 |
| EP | 1887799 A1 | 2/2008 |
| JP | 2000175117 A | 6/2000 |
| JP | 2000322358 A | 11/2000 |
| JP | 2001256496 A | 9/2001 |
| JP | 2002073321 A | 3/2002 |
| JP | 2002112218 A | 4/2002 |
| JP | 2003250033 A | 9/2003 |
| JP | 2004334799 A | 11/2004 |
| JP | 2005531239 A | 10/2005 |
| JP | 2006119920 A | 5/2006 |
| JP | 2006146775 A | 6/2006 |
| JP | 2006180117 A | 7/2006 |
| JP | 2006311121 A | 11/2006 |
| JP | 2007049322 A | 2/2007 |
| JP | 2007096890 A | 4/2007 |
| JP | 2008182392 A | 8/2008 |
| WO | WO0232136 A2 | 4/2002 |
| WO | 2004004341 A1 | 1/2004 |
| WO | 2006120768 A1 | 11/2006 |

OTHER PUBLICATIONS

Classification of Age Groups Based on Facial Features, Wen-Bing Horng et al, 2001.*
International Search Report and Written Opinion—PCT/US2008/084369—ISA/EPO—Jan. 28, 2009.
Mlakar, et al., "Viewer authentication for personalized iTV services," Eighth International Workshop on Image Analysis for Multimedia Interactive Services (WIAMIS'07), 2007, 4 pages.
Rota et al., "Video Sequence Interpretation for Visual Surveillance", published 2000, pp. 1-9.
Samal., et al.,"A Geometric Approach to Face Recognition", 1999, pp. 1-4.

* cited by examiner

| Age Related Level | Size | Facial Feature Ratio | Skin Texture |
|---|---|---|---|
| Adult User Age 18 and Above | Size Range #1 | Ratio Range #1 | Smooth Factor #1 |
| Teen User Age 13 to 18 | Size Range #2 | Ratio Range #2 | Smooth Factor #2 |
| Child User Age 12 and Below | Size Range #3 | Ratio Range #3 | Smooth Factor #3 |

FIG. 11

| Viewer | Size | Facial Template | Body Model | AGE |
|---|---|---|---|---|
| Dad User | Size #1 | Facial Template #1 | Body Model #1 | 42 |
| Mom User | Size #2 | Facial Template #2 | Body Model #2 | 39 |
| Son User | Size #2 | Facial Template #3 | Body Model #3 | 15 |
| Daughter User | Size #3 | Facial Template #4 | Body Model #4 | 6 |
| Dog User | Size #3 | N/A | Body Model #5 | N/A |

| Viewer | Content Allowed | Time of Day Restriction | Day Restriction | Supervisor |
|---|---|---|---|---|
| Dad User | All | None | None | None |
| Mom User | All | None | None | None |
| Son User | R Rated | 10 AM – 8 PM | SAT and SUN | Dad User<br>Mom User |
| | PG-13 Or Below | 8 AM – 10 PM | None | None |
| Daughter User | PG-13 Rated Or Above | Supervisor Needed (All Times) | None | Dad User<br>Mom User<br>Son User (PG Rated Only) |
| | PG Rated | 8 AM – 10 PM (8 PM – 10 PM w/ Son User) | None | |
| | G Rated | 8 AM – 8 PM | SUN to THURS | |
| | | 8 AM – 10 PM | FRI and SAT | |
| Generic Adult User | R Rated Or Below | 6 AM – 11 PM | None | None |
| Generic Teen User | PG-13 Rated Or Below | 8 AM – 10 PM | None | Any Adult User |
| Generic Child User | G Rated | 8 AM – 8 PM | None | Any Adult User |
| Guest User | PG Rated Or Below | 8 AM – 8 PM | None | Any Adult User |
| Dog User | Elimination Reference – No Restriction | | | |

FIG. 17

DEVICE ACCESS CONTROL

CROSS REFERENCE TO RELATED APPLICATIONS

This application claims the benefit of U.S. Provisional Patent Application No. 60/989,787, filed Nov. 21, 2007, and U.S. Provisional Patent Application No. 61/080,743, filed Jul. 15, 2008, each of which is incorporated herein by reference in its entirety.

FIELD

The present disclosure generally relates to controlling access to electronic devices and, in particular, relates to controlling access to video program material displayed by an electronic device, such as a television.

BACKGROUND

Video content rating systems allow adults to make informed decisions on the type of programs the adults allow children to watch based on ratings categories assigned to the video content. Video content rating systems include the TV Parental Guideline system designated by the Federal Communications Commission (FCC) in the United States, and the Motion Picture Association of America (MPAA) film rating system TV Parental Guideline system also designated by the FCC. A parent may grant or deny a child access to video content based on the rating assigned to the video content.

SUMMARY

According to a general implementation, a computer-implemented method includes determining an attribute of a user detected within an image of an area proximate to an electronic media device. The method also includes accessing media settings appropriate for the user based on the determined attribute, and controlling access to the electronic media device based on the accessed media settings appropriate for the user.

Implementations may include one or more of the following features. For example, the method also may include determining at least one of an age-related attribute and a gender attribute and accessing media settings appropriate for a user with at least one of the age-related attribute and the gender attribute. The method further may include receiving, at the electronic media device, a user input command and capturing one or more images of the area proximate to the electronic media device in response to receiving the user input command. The attribute of the user may be determined based on the one or more captured images.

In some implementations, the method may include preventing the user from experiencing particular content accessible through the electronic media device. In these implementations, the method may include preventing the electronic media device from turning on based on the determined attribute of the detected user, preventing the user from tuning the electronic media device to a particular television channel based on a rating of television content being offered over the particular television channel, and/or preventing the user from playing a particular recording using the electronic media device based on a rating of content included in the particular recording.

The method may include receiving a user input command provided by a user using a remote control, accessing multiple images of multiple users, including the user using the remote control, proximate to the electronic media device when the user input command was received, and detecting a position of the remote control in the multiple images. The method also may include determining a position of each of the multiple users based on the multiple images and comparing the position of the remote control to the position of each of the multiple users. Based on the comparison, the user using the remote control may be detected, an attribute of the user using the remote control may be determined, and access to the electronic media device may be controlled based on the accessed media settings appropriate for the user using the remote control.

The method may include detecting presence of infrared light in a first of the multiple images and detecting absence of infrared light in a second of the multiple images. The method also may include determining which of the multiple users is closest to the position of the remote control. The method further may include controlling access to the electronic media device without regard for attributes of the multiple users other than the user using the remote control.

In some examples, the method may include determining an age-related attribute of the user using the remote control and receiving a user input command to access particular content using the electronic media device. In these examples, the method may include determining that the user using the remote control is prevented from accessing the particular content using the electronic media device without supervision of another user with an age-related attribute that is different than the determined age-related attribute of the user using the remote control and that is equal to or greater than a particular age-related level, determining an age-related attribute of at least one of the multiple users other than the user using the remote control based on the accessed images, and determining whether the age-related attribute of the at least one of the multiple users other than the user using the remote control is equal to or greater than the particular age-related level. Conditioned on determining that the age-related attribute of the at least one of the multiple users other than the user using the remote control is equal to or greater than the particular age-related level, the electronic media device may be controlled to access the particular content. Conditioned on determining that the age-related attribute of the at least one of the multiple users other than the user using the remote control is less than the particular age-related level, the electronic media device may be prevented from accessing the particular content.

Further, the method may include identifying physical attributes of the user and accessing information related to typical physical attributes of users in one or more age-related levels. The method also may include comparing the identified physical attributes of the detected user to the accessed information related to typical physical attributes of users in the one or more age-related levels and determining an age-related level of the detected user based on the comparison. The method further may include receiving a user input command from the user to perform a particular operation, accessing a control rule associated with performing the particular operation, the control rule defining an appropriate age-related level associated with performing the particular operation, and comparing the determined age-related level of the user to the appropriate age-related level associated with performing the particular operation. Based on the comparison of the determined age-related level of the user to the appropriate age-related level associated with performing the particular operation, it may be determined whether the particular operation is appropriate for the user.

Conditioned on determining that the particular operation is appropriate for the user, the particular operation may be performed. Conditioned on determining that the particular operation is inappropriate for the user, the particular operation may be prevented.

The method may include identifying at least one of a size of the user, a facial feature ratio of the user, and a skin texture attribute of the user and accessing information related to at least one of size, facial feature ratio, and skin texture. The method also may include comparing the identified at least one of the size of the user, the facial feature ratio of the user, and the skin texture attribute of the user to the accessed information related to at least one of size, facial feature ratio, and skin texture.

In some implementations, the method may include registering one or more users. In these implementations, registering the one or more users may include capturing one or more images of each of the one or more users, identifying one or more physical attributes of each of the one or more users based on the one or more captured images of each of the one or more users, receiving attribute information associated with each of the one or more users, and storing, in electronic storage, the received attribute information in association with the identified one or more physical attributes of the one or more users corresponding to the received attribute information. In these implementations, the method may include identifying one or more physical attributes of the user based on the image, accessing, from electronic storage, registration information related to the one or more registered users, and comparing the identified one or more physical attributes of the user to the accessed registration information. The registration information may include, for each of the one or more registered users, attribute information stored in association with one or more physical attributes. Based on the comparison, it may be determined whether the identified one or more physical attributes of the user match one or more physical attributes included in the registration information. In response to determining that the identified one or more physical attributes of the user match one or more physical attributes included in the registration information, attribute information corresponding to the matched one or more physical attributes may be accessed from the registration information.

The method may include identifying one or more body attributes of the user, and the comparing and determining may be part of a body recognition process based on the one or more body attributes of the user. The method also may include identifying one or more facial attributes of the user, and the comparing and determining may be part of a facial recognition process based on the one or more facial attributes of the user. In response to determining that the identified one or more physical attributes of the user do not match any of the one or more physical attributes included in the registration information, an age-related attribute may be estimated for the user by comparing the identified one or more physical attributes of the user to typical physical attributes of users in one or more age-related levels.

In some examples, the method may include detecting multiple users in the image, determining an age-related attribute for each of the multiple users, and determining media settings appropriate for the user based on the determined age-related attributes for each of the multiple users. In these examples, the method may include identifying, from among the determined age-related attributes for each of the multiple users, the age-related attribute that corresponds to the youngest age and determining media settings appropriate for the user based on the age-related attribute that corresponds to the youngest age. The method also may include determining that physical attributes of one of the multiple users correspond to an elimination reference, and eliminating the one of the multiple users that corresponds to the elimination reference from the multiple users. The elimination reference may define physical attributes of a moving object registered so that the moving object does not impact access control.

Further, in these examples, the method may include receiving a user input command to access a particular type of content, determining that a first user of the multiple users requires supervision to access the particular type of content, and accessing one or more physical attributes associated with users allowed to supervise the first user in accessing the particular type of content. The method also may include comparing one or more physical attributes of the multiple users other than the first user to the accessed one or more physical attributes associated with users allowed to supervise the first user in accessing the particular type of content and, based on the comparison, determining whether at least one of the multiple users other than the first user is allowed to supervise the first user in accessing the particular type of content. Conditioned on determining that at least one of the multiple users other than the first user is allowed to supervise the first user in accessing the particular type of content, the particular type of content may be accessed. Conditioned on determining that none of the multiple users other than the first user is allowed to supervise the first user in accessing the particular type of content, access to the particular type of content may be prevented.

The method may include receiving a user input command to access a particular type of content, initially preventing access to the particular type of content, and allowing a supervisory user to enable access to the particular type of content by providing an unlock command to the electronic media device. The method also may include receiving, at the electronic media device, the unlock command and, in response to receiving the unlock command, accessing one or more images of an unlocking user providing the unlock command. The method further may include detecting the unlocking user in the one or more images of the unlocking user providing the unlock command, identifying one or more physical attributes of the unlocking user based on the one or more images of the unlocking user providing the unlock command, accessing one or more physical attributes of the supervisory user allowed to enable access to the particular type of content, and comparing the identified one or more physical attributes of the unlocking user to the accessed one or more physical attributes of the supervisory user. Based on the comparison, it may be determined whether the unlocking user is the supervisory user. Conditioned on determining that the unlocking user is the supervisory user, access to the particular type of content may be allowed. Conditioned on determining that the unlocking user is not the supervisory user, prevention of access to the particular type of content may be maintained.

In some implementations, the method may include detecting a user entering an area proximate to the electronic media device based on the image. In these implementations, the method may include blocking, without human intervention, content being outputted by the electronic media device in response to detecting the user entering the area proximate to the electronic media device.

According to another general implementation, a system includes a camera configured to capture one or more images of an area proximate to an electronic media device. The system also includes a processor configured to perform operations comprising determining an attribute of a user detected within the one or more images of the area proximate to the electronic media device. The processor also is configured to perform operations comprising accessing media settings appropriate for the user based on the determined attribute and controlling access to the electronic media device based on the accessed media settings appropriate for the user.

According to another general implementation, a computer readable storage medium has encoded thereon a computer program. The computer program includes instructions for determining an attribute of a user detected within an image of an area proximate to an electronic media device. The computer program also includes instructions for accessing media settings appropriate for the user based on the determined attribute and controlling access to the electronic media device based on the accessed media settings appropriate for the user.

According to another general implementation, a system includes a module configured to determine an attribute of a user detected within an image of an area proximate to an electronic media device. The system also includes means for accessing media settings appropriate for the user based on the determined attribute and means for controlling access to the electronic media device based on the accessed media settings appropriate for the user.

The details of one or more implementations are set forth in the accompanying drawings and the description, below. Other features and advantages of the disclosure will be apparent from the description and drawings, and from the claims.

BRIEF DESCRIPTION OF THE DRAWINGS

FIG. 11 depicts an example of data related to typical physical attributes of users in age-related levels.

FIG. 15 depicts an example of data stored for registered users of an electronic device.

FIG. 17 shows example access control rule data that may be used in automatically controlling access to an electronic media for identified users.

DETAILED DESCRIPTION

Techniques are described for automatically and passively controlling access to television and video content. A system may include a camera, and may monitor one or more images captured by the camera to determine an identity and/or age of a user of content using, for example, biometrics. The system may automatically restrict or grant the user access to content based on the determined identity and/or age. For instance, a user determined to be a child may be restricted from watching mature content, but a user determined to be an adult may be allowed to watch mature content without interruption.

Figure 1:
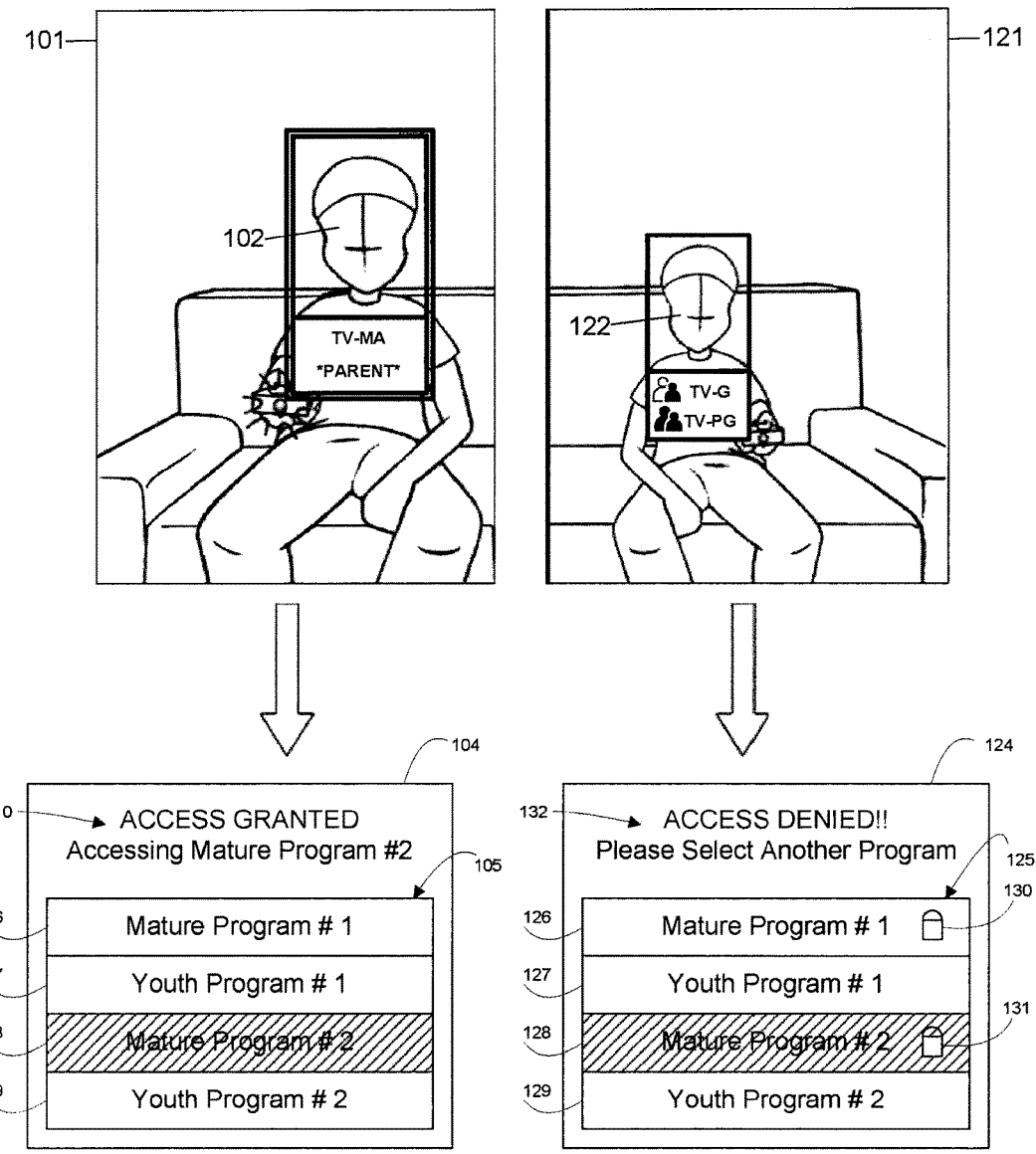
FIG. 1 is a contextual diagram demonstrating access control of electronic devices.

FIG. 1 is a contextual diagram 100 demonstrating access control of electronic devices. As shown, the contextual diagram 100 illustrates an example of controlling access to an electronic media device based on a user using the electronic media device. The contextual diagram 100 shows an example of a dad user 102 attempting to access content using an electronic media device, and also shows an example of a son user 122 attempting to access content using the electronic media device.

When the dad user 102 attempts to access content using the electronic media device, the electronic media device accesses an image 101 of the dad user 102 and analyzes the image 101 to detect users in the image 101. In this example, the electronic media device detects the dad user 102 in the image 101 and analyzes the portion of the image 101 corresponding to the dad user 102 to identify the detected user as being the dad user 102. After identifying the dad user 102 as being the user in the image 101, the electronic media device accesses media settings appropriate for the dad user 102 and controls access to the electronic media device based on the accessed media settings appropriate for the dad user 102.

For example, the dad user 101 may be watching television alone and the device rendering the television content may automatically, without human intervention, identify the dad user 102 as the user watching the television content based on one or more images of an area proximate to the device. In response to identifying the dad user 102 as the user watching the television content, the device allows the dad user 102 to access content using the electronic media device based on media settings for the dad user 102. For instance, the media settings for the dad user 102 may place no restriction on the dad user's ability to access television content using the electronic media device when the dad user 102 is identified as watching television alone, and the dad user 102 may be able to use the electronic media device is an unlimited manner.

The display interface 104 may be displayed on a television to the dad user 102 when the dad user 102 is identified as watching television alone and attempting to access television content. The display interface 104 includes a television listing 105 that lists television programs 106-109 that the dad user 102 may access. As shown, the shading on program 108 indicates that the dad user 102 has selected the program 108 (i.e., Mature Program 2) to view. In response to the dad user 102 selecting the program 108 (i.e., Mature Program 2), the display interface 104 is updated to include a message 110 indicating that access to the selected program is granted and that the television is accessing the program 108 (i.e., Mature Program 2). Because the media settings associated with the dad user 102 indicate that the dad user 102 is permitted to access mature programming (e.g., the dad user 102 has no restriction when watching television alone), the dad user 102 is permitted to watch the program 108 (i.e., Mature Program 2).

In another example, when the son user 122 attempts to access content using the electronic media device, the electronic media device accesses an image 121 of the son user 122 and analyzes the image 121 to detect users in the image 121. In this example, the electronic media device detects the son user 122 in the image 121 and analyzes the portion of the image 121 corresponding to the son user 122 to identify the detected user as being the son user 122. After identifying the son user 122 as being the user in the image 121, the electronic media device accesses media settings appropriate for the son user 122 and controls access to the electronic media device based on the accessed media settings appropriate for the son user 122.

For example, the son user 121 may be watching television alone and the device rendering the television content may automatically, without human intervention, identify the son user 122 as the user watching the television content based on one or more images of an area proximate to the device. In response to identifying the son user 122 as the user watching the television content, the device allows the son user 122 to access content using the electronic media device based on media settings for the son user 122. For instance, the media settings for the son user 122 may indicate that, when the son user 122 is identified as watching television alone, the son user 122 is permitted to watch youth programming, but not mature programming.

The display interface 124 may be displayed on a television to the son user 122 when the son user 122 is identified as watching television alone and attempting to access television content. The display interface 124 includes a television listing 125 that lists television programs 126-129. As shown, the shading on program 128 indicates that the son user 122 has selected the program 128 (i.e., Mature Program 2) to view. In response to the son user 122 selecting the program 128 (i.e., Mature Program 2), the display interface 124 is updated to include a message 132 indicating that access to the selected program is denied and requesting the son user 122 to select another program. Because the media settings associated with the son user 122 indicate that the son user 122 is not permitted to access mature programming when watching television alone, the son user 122 is prevented from watching the program 128 (i.e., Mature Program 2).

To alert the son user 122 that automatic access control prevents the son user 122 from accessing certain programming, the television listing 125 includes locked icons 130 and 131 for programs the son user 122 is prevented from accessing. As shown, the television listing 125 includes locked icons 130 and 131 for each of the television programs that are rated as mature programming (i.e., the program 126 and the program 128). The locked icons 130 and 131 enable the son user 122 to identify blocked programs prior to attempting to select a blocked program.

As illustrated in FIG. 1, a device rendering television content may automatically, without human intervention, be controlled to apply access control media settings for a user by determining an identity of the user currently experiencing television content. In this regard, when the dad user 102 is watching television alone and provides an input command to select a mature program, the device permits the dad user 102 to access the mature program. Alternatively, when the son user 122 is watching television alone and provides an input command to select a mature program, the device automatically prevents the son user 122 from accessing the mature program. In some implementations, when the dad user 102 and the son user 122 are watching television together, combined access control media settings may be automatically determined based on the dad user's access control media settings and the son user's access control media settings. Accordingly, an electronic media device may, automatically and without human intervention, identify users experiencing content using the electronic media device and apply access control settings for the identified users.

Figure 2:
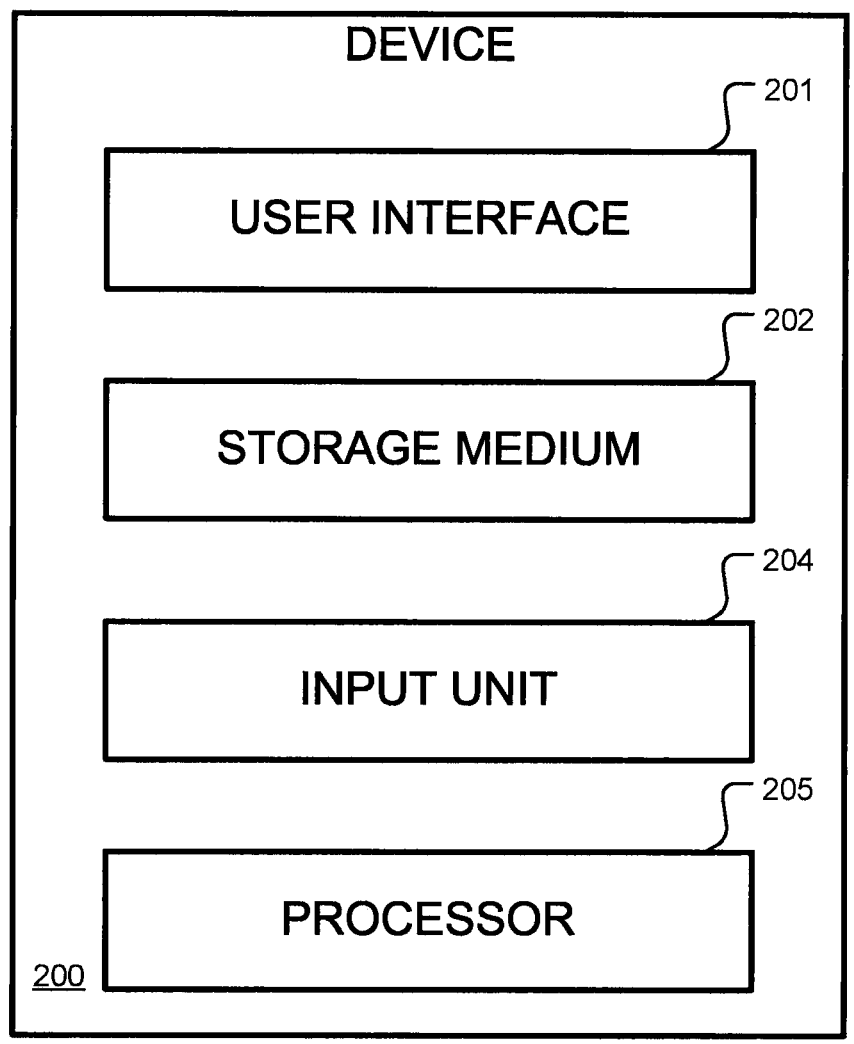
FIG. 2 is a block diagram of an exemplary device.

FIG. 2 is a block diagram of a device 200 used to implement device access control. Briefly, the device 200 includes, among other things, a user interface 201, a storage medium 202, an input unit 204, and a processor 205.

The user interface 201 is a mechanism for allowing a user to interact with the device, or with applications invoked by the device. The user interface 201 may effect both input and output, allowing a user to manipulate the device or for the device to produce the effects of the user's manipulation. The device 200 may utilize any type of user interface 201, such as a graphical user interface (GUI), a voice user interface, or a tactile user interface.

The user interface 201 may be configured to render a visual display image. For example, the user interface 201 may be a monitor, a television, a liquid crystal display (LCD), a plasma display device, a projector with a projector screen, an auto-stereoscopic display, a cathode ray tube (CRT) display, a digital light processing (DLP) display, or any other type of display device configured to render a display image. The user interface 201 may include one or more display devices. In some configurations, the user interface 201 may be configured to display images associated with an application, such as display images generated by an application, including an object such as an avatar. The user interface 201 also may be configured to display television content or other video/media content.

The storage medium 202 stores and records information or data, and may be an optical storage medium, magnetic storage medium, flash memory, or any other storage medium type. The storage medium 202 may store access control settings, data used to identify registered users, and recorded or other media content available for display by the device 200.

The input unit 204 is a hardware mechanism that transforms physical inputs into commands that may be used by the device, such as a keyboard or keypad, mouse, trackball, touchpad, joystick, handheld remote control, camera, or other sensor. In certain implementations, such as where the device 201 uses a touch screen, the functionality of the user interface 201 and the input unit 204 may be combined. The input unit 204 also may be a handheld remote control manipulated by a user to control the device 200.

The device 200 is electrically connected, over a wireline or wireless pathway, to the input unit 204 and the user interface 201, and is configured to control the operation of the processor 205 to provide for control of the device 200. In one configuration, the device 200 uses the processor 205 or other control circuitry to execute an application that provides for device access control. The device 200 may be implemented as a set top box, a television, an ultra-mobile personal computer (UMPC), a mobile internet device (MID), a digital picture frame (DPF), a portable media player (PMP), a general-purpose computer (e.g., a desktop computer, a workstation, or a laptop computer), a server, a gaming device or console, an electronic media player (e.g., a digital video disc (DVD) player, a compact disc (CD) player, a digital video recorder (DVR)), or any other type of electronic device that includes a processor or other control circuitry configured to execute instructions, or any other apparatus that includes a user interface.

Figure 3:
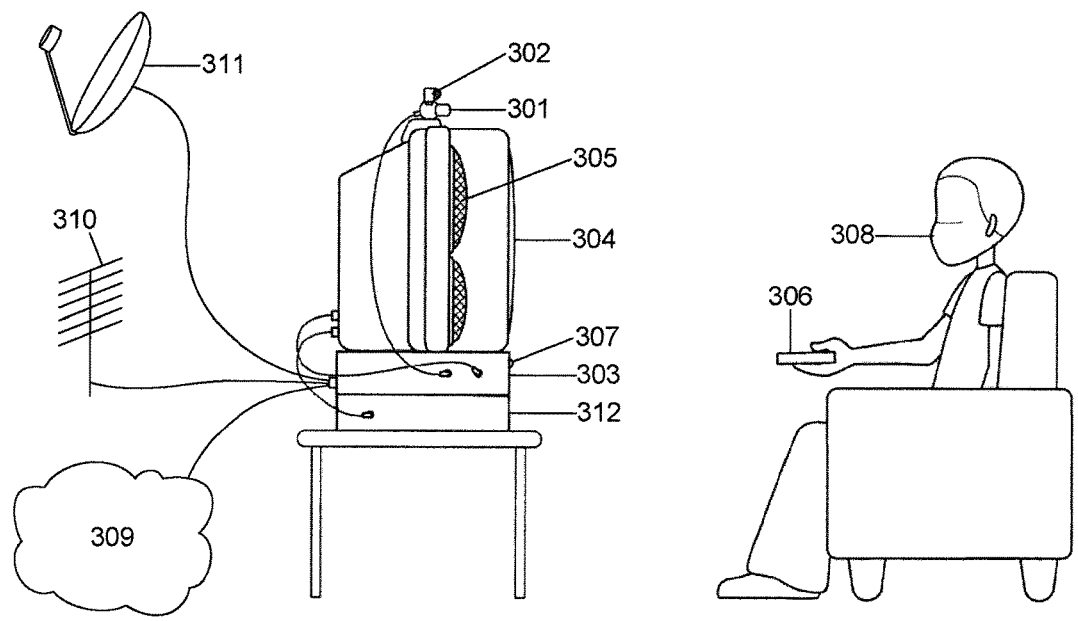
FIG. 3 illustrates an example of a system configured to control access to an electronic device.

FIG. 3 illustrates an example of a system configured to control access to an electronic device. The system includes a camera 301, an optional infrared emitter 302, a processor 303, a display device 304, audio speakers 305, a hand-held remote control 306, an infrared receiver 307 capable of receiving and decoding infrared signals, a network 309, an antenna 310, a satellite dish 311, and optical disk player (e.g., DVD player) 312. One or more users 308 may attempt to view video content and the system may control the display of video content based on a determined attribute of the one or more users 308.

The camera 301 may include a color video camera, an infrared-sensitive camera and infrared emitter 302 operable to sense a user in low ambient light, a stereo camera operable to generate a depth measurement, a time-of-flight camera including an emitter operable to generate a depth measurement, or any other type of optical sensor. In some configurations, the camera 301 and emitter 302 may be incorporated into or otherwise affixed to the bezel of a television, monitor, or other electronic device. In some configurations, the camera 301 and emitter 302 may be positioned around a room so that the field of view of the camera (or multiple cameras) observe the entire room.

The processor 303 may be included in a television receiver, a personal computer, a Digital Versatile Disc or Digital Video Disc (DVD) player, a video game console, or another type of device. The processor 303 may be included in any type of electronic device and may operate in combination with multiple processors and/or multiple electronic devices.

The display device 304 may be operable to display a video program. The display device 304 also may display graphics generated by the processor 303. The display device 304 may include a television, a projector, a computer monitor, or any other type of display device. For instance, the display device 304 may be included in a portable electronic device to display content.

The audio speakers 305 are operable to produce sound. The audio speakers 305 may be part of the display device 304 or may be separate from the display device 304. In some configurations, speakers may include headphones.

Further, a hand-held remote control 306, may be operable to transmit commands to the processor 303. An example of a remote control is described below with respect to FIG. 4. A remote control 306 may include buttons, and transmit commands by emitting an infrared signal when a button is pressed. A command may have multiple functions depending on the context of the system. The system may include an infrared receiver 307 capable of receiving and decoding infrared signals (e.g., infrared signals emitted from the remote control 306).

The one or more users 308 may watch the image displayed on the display device 304 and listen to the sound produced by the speakers 305. A camera 301 may be oriented and focused such that all or some of the users 308 are within the camera's field of view.

The camera 301 captures or otherwise produces camera images, which may be transmitted to the processor 303. The processor 303 may process the camera images using techniques described throughout this disclosure. The processor 303 may receive and decode content descriptor tags embedded within video program data. The processor 303 may control the video being displayed on the display device 304 and also may control the audio being played though the speakers 305 based on user attributes and the decoded content descriptor tags. The processor 303 also may generate computer graphics for rendering on the display device 304.

The processor 303 may be connected to a network 309, an antennae 310, a satellite dish 311, an optical disk player (e.g., DVD player) 312, or other devices used to receive video and audio content. The processor 303 further may be connected to a recording device (e.g., a personal video recorder, a video tape recorder, a DVD recorder, a digital video recorder (DVR), etc.) capable of recording video and audio program material.

Figure 4:
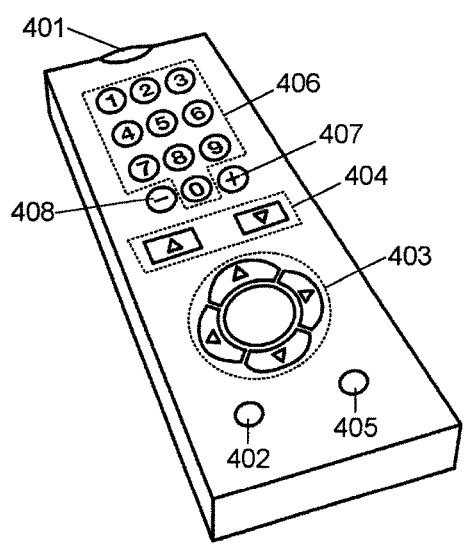
FIG. 4 illustrates an example of a remote control.

FIG. 4 illustrates an example of a remote control (e.g., remote control 306 shown in FIG. 3). The remote control includes an infrared emitter 401 that transmits control data using an infrared signal. As described in more detail below, an electronic device may identify the position of the remote control by analyzing camera images that include light generated from the remote control's infrared emitter 401. In some implementations, the remote control does not require additional hardware to be compatible with a system that controls an electronic device based on an attribute of a user and a detected position of the remote control. Also, the remote control may be a universal or a programmable remote control.

The remote control may include a button 402 so that a user may directly access or initiate a configuration process. Alternatively, a user may access a configuration process as an option of the device's setup menu. The configuration process, described in more detail below, enables registration of known/authorized users such that access control settings may be stored for registered users and automatically applied when the system detects the registered users.

The remote control also includes directional buttons 203 that allow a user to navigate through a user interface and select an interface control. For instance, during a configuration process, a user may navigate through different facial images of users using the directional buttons 403 and select an image of the user's face being registered. A user also may use the directional buttons 403 to navigate a programming guide, a list of recordings, media settings, menu options, or other interface control options used to control and establish settings of an electronic media device.

The remote control further may include buttons 404 that enable a user to control various aspects of an electronic device. For example, the buttons 404 may be used to change a channel of an electronic device rendering a display of television programming or may be used to cycle through displayed options for controlling the electronic device.

The remote control may include a button 405 that directly overrides the system's access control settings and restores the device to default settings. The remote control may include numerical input buttons 406 that allow a user to provide numerical input to the electronic device controlled by the remote control. For instance, a user may directly type in a channel number using the numerical input buttons 406 to change a channel being tuned by the electronic device.

Buttons 407 or 408 may allow a user to control access control settings. For example, a user may use the buttons 407 and 408 to adjust access control settings of the electronic media device (e.g., set parental controls for child users).

Figure 5:
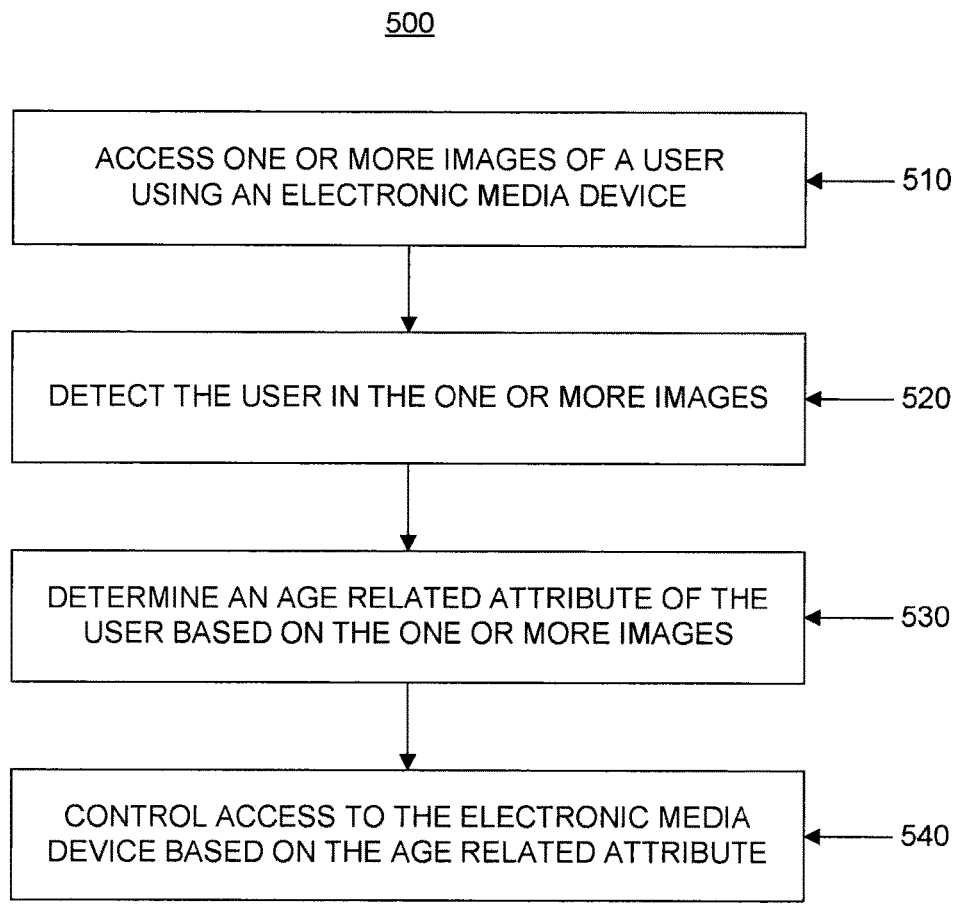
FIGS. 5, 7, 10, and 12 are flowcharts of exemplary processes.

FIG. 5 illustrates a process 500 for controlling an electronic media device based on an attribute (e.g., an age-related attribute and/or a gender attribute) of a user. For convenience, particular components described with respect to FIG. 2 are referenced as performing the process 500. However, similar methodologies may be applied in other implementations where different components are used to define the structure of the system (e.g., components described with respect to FIG. 3), or where the functionality is distributed differently among the components.

The processor 205 accesses one or more images of a user using the electronic device 200 (510). For example, the processor 205 may receive one or more images from one or more cameras capturing images of an area proximate to an electronic device 200. The processor 205 also may access one or images of a user using the electronic device 200 from the storage medium 202. The processor 205 may continuously access images of an area proximate to the device 200 or may access images of an area proximate to the device 200 in response to input commands received using the input unit 204.

The processor 205 detects a user in the one or more images (520). For example, the processor 205 may process or analyze the accessed images to detect a user's face or body in the accessed images. In this example, the processor may detect a user by comparing features in the accessed images to typical features of users in images or may detect a user by detecting motion in the accessed images. The processor 205 also may detect a user based on skin color analysis of the accessed images or may detect a user by comparing a current image including one or more users with a background model to detect differences between the current image and the background model. The processor 205 may use any type of technique to detect a user within a single image or within a set of multiple images of the user.

In some implementations, the processor 205 may detect users using a face detection process. The face detection process may automatically detect faces of users within one or more camera images, and may determine the location, size, or other physical characteristics of human faces within the one or more camera images.

The face detection process may include analyzing features. Analyzing features may include identifying features (e.g., edges or gradients) within one or more camera images, and identifying a set of features that may correspond to a face. A set of features may be determined to correspond to a face where the arrangement (e.g., shape) is consistent with that of a human face. For instance, a collection of features may be identified as a face if an outline or shape of the collection of features is similar to a head with shoulders below the head.

The face detection process also may include analyzing color. Analyzing color may include comparing camera images to a color model, identifying parts of the camera image that have colors consistent with human skin and facial features, clustering those parts of the camera image having colors consistent with human skin and facial features, and classifying a cluster as a face if it meets a set of size and shape criteria.

The face detection process further may include filtering faces, in order to avoid detecting faces that do not correspond to user (e.g., a face appearing in a photograph). Faces may be filtered based on a size criteria, whereby faces are excluded if they are smaller than a predefined size threshold. Faces also may be filtered based on a motion criteria, whereby faces are excluded if they remain motionless for longer than a predefined duration threshold. In systems where the camera capturing the accessed images is capable of detecting range or depth (e.g., a stereo camera or a time-of-flight camera), faces may be filtered based on a shape criteria, whereby faces are excluded if they are flat.

In some arrangements, the processor 205 may detect users using a body detection process. The processor may implement a body detection process, where the body detection process continuously monitors the accessed camera images to detect users by detecting parts of the accessed camera images that are inconsistent with a background model. Parts of the camera image inconsistent with a background model may include a user's body.

In a body detection process, a background model may include a range of color values representing a background, for each part (e.g., pixel) of a background. A color background model may be used where the system includes a camera capable of acquiring color images. A background model also may include a range of luminance values representing a background, for each part (e.g., pixel) of a background. A luminance background model may be used where the system includes a camera capable of acquiring infrared images.

In another implementation of a body detection process, a background model may include a range of distance measurements representing a background, for each part (e.g., pixel) of a background. A distance measurement may offer a benefit over color and luminance measurements, in that a distance rarely changes (e.g., unless furniture is moved the distance does not change). A distance measurement may be acquired by a camera capable of determining range or depth (e.g., a stereo camera or a time-of-flight camera). An example of a time-of-flight camera includes that produced by Canesta, whereby an infrared emitter emits a pulse of infrared light, and an optical sensor measures the time the light takes to travel to an object and back to the camera. The time-of-flight camera calculates the distance of the object based on the measured time. An example of a stereo camera includes that produced by Tyzx, whereby a stereo camera includes multiple optical sensors that capture images of a scene from multiple viewpoints, and compares the multiple images to determine the disparity in the position of objects between the multiple viewpoints. The stereo camera calculates a distance of the object based on the determined disparity.

The body detection process may acquire a background model by sampling a representation of a scene without a user. A representation of the background may include a color measurement, luminance measurement, or distance measurement for parts (e.g., pixels) of a camera image. A measurement may include a range of values.

The body detection process also may implement a dynamic background model process which updates a background model to account for changes in a scene. A dynamic background model process may include a buffer capable of storing n representations of a background. Initially, all n samples may be filled with a representation of a scene. A sampling process may sample camera data at regular intervals of time (e.g., a sampling rate r). Each sample may be added to the background model, replacing the oldest sample. Therefore, a background model buffer may store the most recent n samples of a scene, which may represent the scene during a span of time, t, according to equation (1):

$$t = \frac{n}{r} \tag{1}$$

The span of time t may be longer than a user may be expected to sit in front of the display device (e.g., several days). Where a representation of the background may include a color or luminance measurement, a buffer may store several representations for each time of day, so that the system accommodates changes in ambient lighting that occur throughout the day. For example, t may be 7 days and r may be one hour, so that the system acquires a sample every hour of every day and stores one week's worth of data.

A dynamic background model process also may include a selection process that selects a value for each part (e.g., pixel) of an image, where that value may represent the background. A selection process may select a typical value. Selecting a typical value may include selecting a median value. A median value may accurately represent a background if a user is absent from at least half of all the samples.

In an implementation where a representation of the background includes a color or luminance measurement, a selection process may calculate a typical value of all samples stored in the history buffer acquired at the same time of day. In another implementation where a representation of the background may include a color or luminance measurement, a selection process may normalize all samples stored in the history buffer to reduce the effects of ambient light levels that may change throughout the day. In an implementation where a representation of the background may include a distance measurement, a selection process may calculate a typical value of all samples in the history buffer, since the distance does not change according to time of day.

The body detection process may compare one or more camera images to a background model. The body detection process may compare a current camera measurement (e.g., color, luminance, or distance) with a corresponding selected background model measurement. A body detection process may classify each part (e.g., pixel) as foreground if the difference between the current camera measurement and corresponding selected background model measurement is greater than a threshold, and classify each part (e.g., pixel) as background if the difference between the current camera measurement and corresponding selected background model measurement is less than a threshold. For example, in implementations where a measurement includes a distance, a user may be detected because the distance to the user's body may be shorter than the distance to the background (e.g., the couch the user is sitting on).

A body detection process further may include a clustering process. A clustering process may select parts classified as foreground that may correspond to a user. Therefore, a clustering process may determine the number of users, and the size and position of each user.

The clustering process may be used to fit a three dimensional model of a human body to match the three dimension shape of a user. A camera distance measurement may represent the front surface of a user (e.g., a time-of-flight camera can measure the front of a user, but may not be able to measure the back of a user). Fitting a three dimensional model of a human body to the three dimensional shape of a user may include fitting a surface of a three dimensional model of a human body to a surface of a shape of a user. A back surface of a user may be assumed to be bounded by a background model.

Fitting a three dimensional model of a human body to the three dimensional shape of a user further may include fitting a volume of a three dimensional model of a human body to a volume defined by the difference between a camera distance measurement and a background distance measurement. A volume defined by the difference may be dilated to account for a portion of a user that may exist behind the background model surface (e.g., the part of a user that sinks into soft couch cushions). Fitting a three dimensional surface and volume may utilize a gradient process, which may find a configuration of a model of a user that optimally fits camera data. A configuration of a model of a user may include an arrangement and scale of body components.

After detecting a user, the processor 205 determines an attribute (e.g., an age-related attribute) of the detected user based on the one or more images (530). For example, the processor 205 may perform a classification (e.g., an age or gender classification) process to infer an attribute of the detected user or may identify the user using a facial recognition or body recognition process and determine an attribute for the user based on the identification. The processor 205 may compare features of the detected user's face or body with features of faces or bodies that are typical for certain age groups or genders or features of faces or bodies of registered or otherwise known users. Based on the comparison, the processor 205 may determine an attribute of the detected user.

In some implementations, the processor 205 performs an age classification process using an image of a face to determine an age-related attribute of the detected user. In these implementations, the processor 205 may automatically estimate the ages of users who are detected within one or more camera images (e.g., all users detected by the processor 205 in performing the process described with respect to numeral 520 above). The age of users may be estimated based on the appearance of a user's face within the one or more camera images. The age of users may be estimated as one of a set of age groups (e.g., young child, older child, and adult). For example, the processor 205 may analyze images captured by a camera to detect a face of a user located in front of the camera. After detecting the face, the processor 205 then may analyze the detected face to determine an age group to which the detected face belongs.

In implementing a process to classify the age of a detected face, the processor 205 may extract features of a detected face, and compare those features to a statistical model. For example, extracting features may include processing a Gabor wavelet operation, and features may include Gabor wavelet coefficients. A Gabor wavelet or similar measure may reduce the variable effects of scale and lighting. Comparing features to a model may include a Support Vector Machine (SVM) classifier operation, and a statistical model may include a model pre-computed from a large sample of human faces.

In implementing a process to classify the age of a detected face, the processor 205 also may analyze the position of a person's facial features. The relative positions of a child's facial features change as the child grows, and analysis of facial feature position may enable classification of a person as a young child. Analyzing the position of facial features may include finding the position of facial features (e.g., chin, eyes, mouth, nose, and the top of the head), computing a set of facial feature ratios (e.g., horizontal eye separation to the vertical distance between eyes and mouth), comparing the set of ratios to child classification criteria, and classifying the user as a young child if the criteria is satisfied.

A person's bone structure does not change once grown (e.g. once becoming an adult), and an additional method of classifying users as older youths or adults may be used. A process to classify the age of a detected face may further include analyzing the face skin texture. The smoothness of the skin or presence of wrinkles may be an indication of age. Analyzing face skin texture may include finding the position of facial features (e.g., chin, eyes, mouth, nose, and the top of the head), identifying sample regions of the person's face (e.g., the cheeks and forehead) based on the position of facial features, identifying defects such as wrinkles and creases (e.g., by using an edge detection process), and classifying the user as a youth or adult based on the strength of the defects.

The processor 205 also may perform an age classification process using an image of a body to determine an age-related attribute of the detected user. To classify the age of a detected user, the processor 205 may analyze the size of a person's body. The size of a user's body may be sufficient to classify a user's age. In particular, the size of a user's body may be used to classify a user as a child or an adult. To perform age classification using an image of a body, the processor 205 may compare a configuration of a model of a detected user to body classification criteria. For example, a detected user may be classified as a child if the corresponding model configuration includes body component sizes that are smaller than a threshold.

To determine an attribute of a detected user, the processor 205 further may implement a user identification process that automatically identifies users detected within one or more camera images (e.g., all users detected by the processor 205 in performing the process described with respect to numeral 520 above). The identity of particular users may be determined based on the appearance of a user's face within the one or more camera images. For example, the processor 205 may analyze images captured by a camera to detect a face of a user located in front of the camera. After detecting a user's face, the processor 205 then may analyze the detected face to determine whether the detected face belongs to an identifiable or known user.

The processor 205 may implement a face identification process to identify faces within a camera image. The face identification process may include selecting a part of an image where a face is detected, and comparing the selected part of the image to a template. The storage medium 202 may include stored templates of users. For instance, the device 200 may store templates of users for comparison to detected users in an identification process. The templates may be generated in a configuration/registration process using techniques described in more detail below.

The face identification process may include using an eigenimage process. An eigenimage face recognition process may include selecting a part of an image where a face is detected, calculating a covariance matrix, and calculating the eigenvectors and eigenvalues of the covariance matrix. The eigenimage face recognition process also may include performing principal component analysis to select the principal components and reduce the dimensionality of the eigenvectors and eigenvalues, and comparing the resulting eigenimage data to a predefined eigenimage data set to generate a set of similarity measurements between the detected face and the faces in the predefined eigenimage data set. Based on the comparison, a statistical analysis may be performed to classify the eigenimage as a user's face. The statistical analysis may utilize data generated during a training process that may be performed in a configuration/registration process using techniques described in more detail below.

The face identification process also may include a Pseudo 2-D Hidden Markov Chain (P2HMM) face recognition process. A Pseudo 2-D Hidden Markov Chain (P2HMM) face recognition process may include modeling a face with a set of hidden Markov states. Hidden Markov states may be arranged in rows and columns. A Pseudo 2-D Hidden Markov Chain (P2HMM) face recognition process further may include fitting a face into a set of P2HMM models, calculating a likelihood of the face being from a model, and selecting the model of largest likelihood. A set of P2HMM models may utilize data generated during a training process that may be performed in a configuration/registration process using techniques described in more detail below.

The face identification process also may utilize the Viola-Jones face detection process. The Viola-Jones face detection process may be used for detected faces that are facing the camera. Other detected faces at bad angles may be filtered out prior to performing the face identification process.

Where a range or depth camera (e.g., a stereo camera or a time-of-flight camera) is used, the face identification process may include using a three-dimensional face recognition process. A three-dimensional face recognition process may include selecting a part of an image where a face is detected, generating a three-dimensional model (e.g., mesh data) and texture model of the detected face, and comparing the three-dimensional model and texture model to templates of users. The templates may be generated in a configuration/registration process using techniques described in more detail below.

The processor 205 also may determine the identity of particular users based on analysis of a user's body in the images. In some implementations, the processor 205 may implement a body identification process to determine the size of a user's body. The size of a user's body may be sufficient to determine a user's identity if a set of possible users is sufficiently small (e.g., where a set of possible users represents members of a family). A body identification process may compare a configuration of a model of a detected user to stored measurements of registered users. A registered user having the closest match (e.g., most similar size) may be selected to determine the identity of a user.

In some implementations, determining an attribute of a user may include other techniques for identifying a user or classifying a user's age. The processor 205 may implement either or both of a user identification process and a classification process to determine an attribute for a detected user. The processor 205 also may implement an age classification process utilizing face, body, a combination of face and body, or other techniques.

In response to determining the attribute of the detected user, the processor 205 controls access to the electronic media device based on the attribute (540). For instance, the processor 205 may access user access control rules and control access to the electronic media device based on a comparison of the determined attribute and the user access control rules. In some examples, the processor 205 may control access to the electronic media device automatically without human intervention. Accordingly, when a user chooses to experience content using the electronic device 200, access control settings are automatically applied and the user may or may not be permitted to experience the chosen content. Moreover, because access control may be based on a determined physical attribute, the access control rules may be difficult for the user to evade as the user is likely unable or unwilling to modify/change the physical attribute used as a basis for access control.

In some configurations, the processor 205 may automatically and passively block a program, channel, input, or function based upon the determined attribute. The processor 205 may block live and pre-recorded programming including a content rating tag, if that tag exceeds a rating configured for a registered user, age group, or configured combinations of registered users and age groups. The processor also may block a channel, input, or function if configured to block that channel, input, or function for a registered user, age group, or configured combinations of registered users and age groups.

The processor 205 may block a program, channel, input, or function when a user is detected within a camera image, where a user identification process identifies the presence of a user who is not authorized to view the content or use the function. The processor 205 may block a program, channel, input, or function when one user that is authorized to view the program, channel, input, or function is present, but another user that is not authorized to view the program, channel, input, or function also is present. For example, if an adult and child are watching television together, the processor 205 may block mature programs that would be permitted if the adult were watching television alone because of the presence of the child.

The processor 205 further may block a program, channel, input, or function when a user is detected within a camera image, where an age classification process classifies a user to be of an age group that is not authorized to view the content (e.g., a child is present). In configurations where an age classification process is disabled or in implementations that do not include an age classification process, the processor 205 may block a program channel, input, or function when a user is detected within a camera image and a user identification process is unable to determine the identity of the user.

The processor 205 may block a program, channel, input, or function when no user is detected within a camera image (e.g., to prevent a child from viewing mature content while hiding their face). The processor 205 also may block a program channel, input, or function when motion is detected that is not associated with a recognized user (e.g., to prevent a child from viewing mature content while hiding, when an adult is using the system). For example, an adult may have fallen asleep within the field of view of the camera image and a child may attempt to watch mature content while the adult is asleep. In this example, the processor 205 may determine that the motion associated with the input to watch mature content is not from the adult even though the adult is in the room and prevent the mature content from being shown. Motion not associated with a user may be detected as a frame-to-frame difference in pixel intensity having a position further than a maximum distance threshold from any detected user (e.g., face) position.

The processor 205 may continuously monitor a camera image, so that the processor 205 may block content immediately upon a user entering a room (e.g., a mature program may be blocked immediately upon a child walking into a room where a parent is watching the mature program). The processor 205 also may monitor camera images when or in response to a change in content or other input command is detected.

To block a program, channel, input, or function, the processor 205 may mute the audio (so that the program's audio is not produced through the speakers), and the video may be replaced with a computer graphic (so that the program's video is not produced by a display device). The computer graphic may include a message explaining that the program (or other content or function) is blocked, and provide instructions that may allow the user to temporarily unblock the program (e.g., gain permission to watch the program).

In some arrangements, the processor 205 provides a relatively simple mechanism for temporarily overriding a rating or configuration so that content configured to be blocked may be viewed with the acknowledgement of a user with administrator rights (e.g., a parent may allow a child to view a mature program under direct supervision or may provide the child with a temporary password to view a mature program when the parent is not present). A remote control may include a button to directly override the processor's 205 decision to block a program. Alternatively, an override process may be accessed as an option of the device's setup menu.

To ensure that unauthorized users cannot override the processor's 205 decision to block a program, a user identification process (described above) may ensure that a user with administrator rights is present, or an age classification process (described above) may ensure that an adult is present prior to overriding the decision to block the program. A process to associate remote control operation to a user (as described below) may further ensure that the override command is issued by a user with administrator rights, or by an adult. In some implementations, overriding does not require that a user enter a PIN number and may provide a convenient mechanism for unlocking content.

The processor 205 may censor the listing of programs when displaying a program guide (e.g., an on-screen list of programs) based on rating information included within the program guide data. The system may exclude channels from a program guide based on configuration data and a detected attribute of a user. The system also may exclude channels from a program guide based on rating information included within the program guide data and a detected attribute of a user.

Attributes other than age may be used to control the electronic media device. The processor 205 may determine a gender attribute for a user and control the electronic media device based on the gender attribute. For instance, when a user is identified as a female user, the processor 205 may configure an electronic programming guide for the female. The configured electronic programming guide may have channels directed to female users sorted toward the top of the electronic programming guide or may be filtered to include those channels that are directed to female users.

Figure 6:
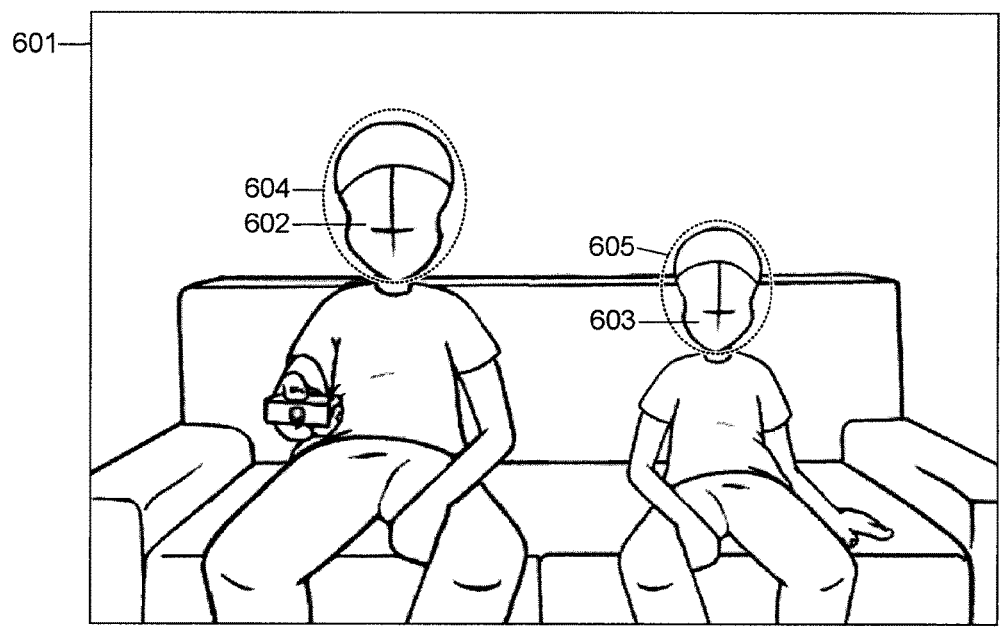
FIG. 6 illustrates an example of detecting users in a camera image.

FIG. 6 illustrates an example of detecting users in a camera image 601. The camera image 601 depicts an example of a camera image where users' faces are detected. In this example, the users' faces may automatically be detected within a camera image, and analyzed using a classification or identification process to determine an attribute of the detected users.

Referring to the example camera image 601, the face 602 of a dad user and the face 603 of a son user may be detected. A sampling process may select a part of the camera image corresponding to each face. For example, part 604 may be selected as corresponding to the face 602 of the dad user and part 605 may be selected as corresponding to the face 603 of the son user. Selecting a part of the camera image may include isolating a face by cropping the camera image, or applying a mask of an oval shape to the camera image. A sampling process may generate a model of a user in accordance with a user identification process. For example, in an implementation in which a user is identified based on facial appearance, a sampling process may store a sample of a user's facial appearance. In another implementation in which a user is identified based on body measurements, a sampling process may store a sample of a three dimensional human body model configuration.

In response to detecting the part 604 of the image as corresponding to the face 602 of the dad user and detecting the part 605 of the image as corresponding to the face 603 of the son user, the electronic media device may be controlled in a manner appropriate for the dad user and the son user experiencing content together. For instance, the electronic media device may allow the dad user and the son user to experience all of the content the son user is allowed to experience alone, and additional content the son user is allowed to access when supervised by an adult user (e.g., the dad user). The electronic media device may not allow the dad user and the son user to experience all of the content the dad user is allowed to experience alone because some of that content may not be appropriate for the son user even with supervision. The dad user may be able to override the automatic access control of the electronic media device if the dad user is designated as an administrator.

Figure 7:
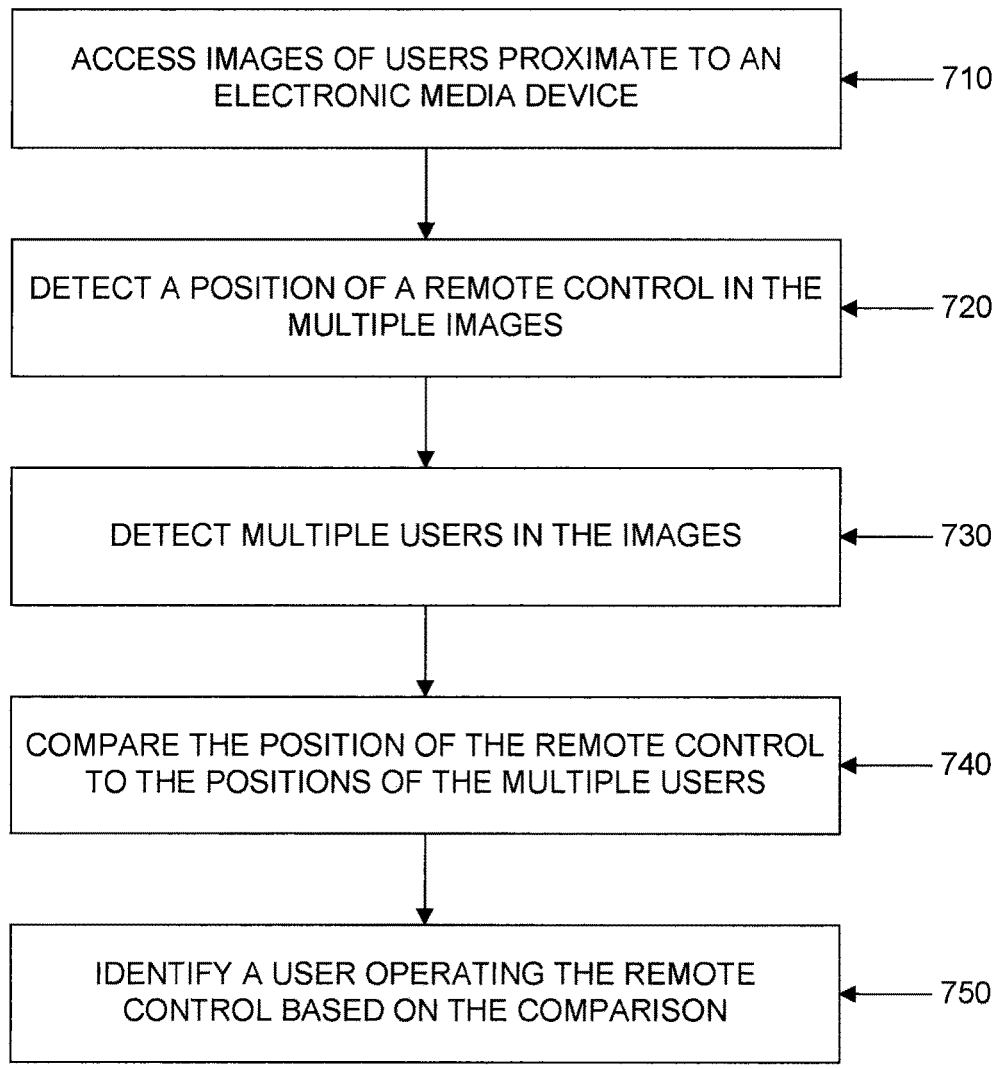

FIG. 7 illustrates a process 700 for identifying a user that is operating a remote control. For convenience, particular components described with respect to FIG. 2 are referenced as performing the process 700. However, similar methodologies may be applied in other implementations where different components are used to define the structure of the system (e.g., components described with respect to FIG. 3), or where the functionality is distributed differently among the components.

The processor 205 accesses images of users proximate to the electronic media device 200 (710). The processor 205 may access images that are continuously (or regularly/periodically) captured. The processor 205 also may access images in response to receiving a user input command and identify images taken at a time when the user input command was received. To access images in response to receiving the user input command, the processor 205 may control a camera to capture images based on receiving the user input command.

The processor 205 detects a position of a remote control in multiple images included in the accessed images (720). Detecting a position of a remote control may involve detecting, in the multiple images, successive images having first presence and then absence of infrared light generated by the remote control in transmitting a user input command. Detection of infrared light enables detection of the remote control because the remote control is the source of the infrared light.

In some examples, a remote control may transmit control data using an infrared signal, and the processor 205 may identify the position of the remote control based upon the light generated from the remote control's infrared emitter. In these examples, a camera may be configured to be sensitive to infrared wavelengths of light. Typical consumer electronic remote controls transmit control data at a wavelength between 850 nm and 950 nm, which may be detected by CCD and CMOS image sensors included in cameras. The camera need not be configured to demodulate the infrared signal to decode the control data because the purpose is to identify a user operating the remote control, rather than determining the command entered by the user.

Figure 8:
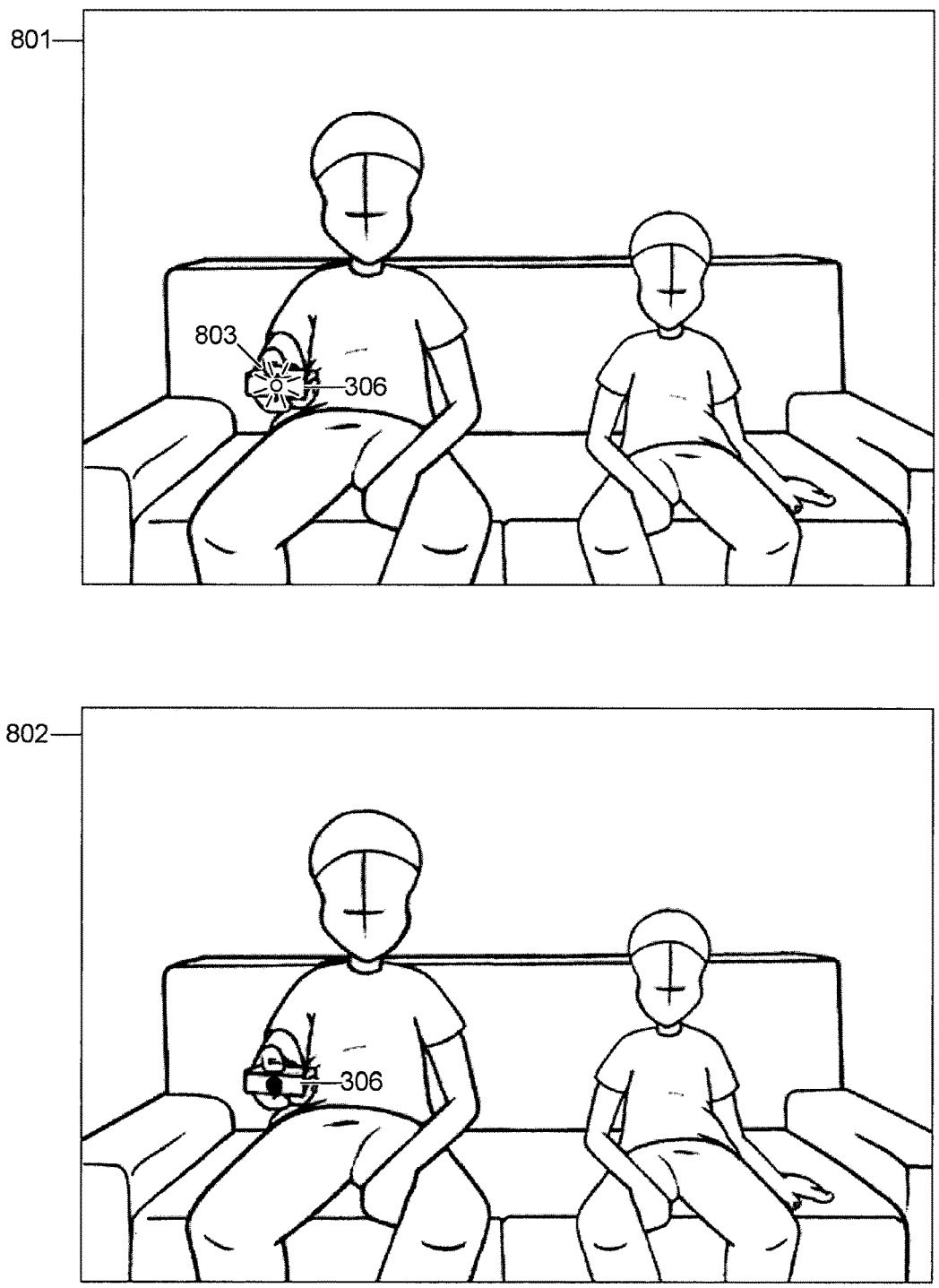
FIG. 8 illustrates examples of camera images including a user operating a remote control.

FIG. 8 illustrates examples of camera images including a user operating a remote control. When an infrared receiver of the electronic media device receives control data, the processor 205 may initiate a remote control positioning process (e.g., numeral 720). Referring to the example of FIG. 8, the remote control positioning process scans a first camera image 801 acquired while the remote 306 is emitting a signal, and scans a second camera image 802 acquired while the remote 306 is not emitting a signal. The first camera image 801 may be a current camera image, and the second camera image 802 may be a recent camera image that is stored in a memory buffer. The process scans the images to detect a point of high luminance 803 in the first image 801 that is not found in the second image 802. The point of high luminance 803 may be detected as the position of the remote control 306.

Referring again to FIG. 7, the processor 205 detects multiple users in the images (730). For example, the processor 205 detects multiple users in the images using techniques similar to those described above with respect to numeral 520 shown in FIG. 5.

The processor 205 compares the position of the remote control to the position of the detected users (740) and identifies a user operating the remote control (750). When multiple users are detected in the accessed images, the processor 205 may analyze the accessed images to determine a position (e.g., a position of a face, a position of a center of mass of the user, a position of the user's hand, etc.) of each of the multiple users. The processor 205 then may compare the position of each of the multiple users to the position of the remote control and identify the user whose position is closest to the remote control. The processor 205 may select the user whose position is closest to the remote control as the user operating the remote control and determine that the other users in the accessed images are not operating the remote control.

Figure 9:
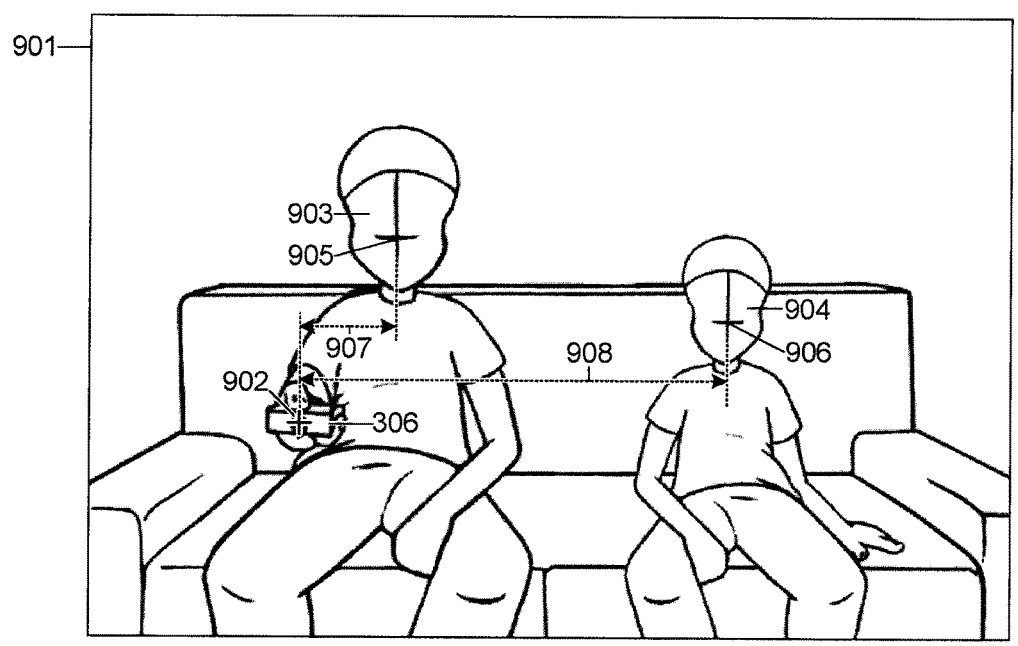
FIG. 9 shows an example of comparing a position of a remote control to a position of a user.

FIG. 9 illustrates an example of comparing a position of a remote control to a position of a user. The processor 205 may identify a detected user in a camera image 901 as the user operating a remote control 306 based on the position of the remote control relative to detected users within the camera image 901. As shown in FIG. 9, the processor 205 identifies a position 902 of a remote control 306 in the camera image 901 and also detects faces 903 and 904 within the camera image 901. A distance 907 may be measured between a remote control position 902 and the position 905 of a first user in the camera image 901. A distance 908 also may be measured between a remote control position 902 and the position 906 of a second user in the camera image 901. The distances 907 and 908 may be compared and a shortest distance (i.e., distance 907) may be selected. The user 903 associated with the shortest distance (i.e., distance 907) may be identified as the user operating the remote control 306.

In implementations in which a face position is used as a user position, distance measurement analysis may give stronger weight to the horizontal component of the distance than to the vertical component of the distance because a remote control is typically held at a height lower than a face. In addition, the processor 205 may ask for user input to confirm that the user operating the remote control has been properly identified. For example, if a first user is operating a remote control in a hand that is placed over a second user's shoulder, the position of the remote control may be closer to the second user's face than the first user's face and, thus, the processor 205 may improperly identify the second user as being the user that is operating the remote control. In this example, the first user may provide input overriding the identification of the second user as being the user operating the remote control and indicate that the first user is actually the user operating the remote control. Other techniques (e.g., comparing the position of the remote control to a position of a user's hand, analyzing the body shape of users detected in the images, etc.) may be used to better identify which user is operating the remote control when users are positioned closely together in a camera image.

To summarize, FIG. 7 illustrates a process to identify a particular user who is operating a remote control. When multiple users are present in one or more camera images, the processor 205 may determine which user is operating the remote control and, therefore, controlling the television or other electronic device. The processor 205 may identify a user who is operating a remote control by identifying the position of the remote control in a camera image and correlating that position to a position of a user within the camera image.

For example, the processor 205 may analyze images captured by a camera to detect one or more faces of one or more users located in front of the camera. The processor 205 also may analyze images captured by the camera to detect a remote control. After detecting multiple faces and a remote control, the processor 205 may determine which user is operating the remote control. The processor 205 further may analyze the detected face corresponding to the user who is operating the remote control and determine an attribute for the user operating the remote control based on a classification of features of the user in the images or the identity of the user who is operating the remote control. The processor 205 may determine the attribute for the user operating the remote control using techniques similar to those described above with respect to numeral 530 shown in FIG. 5.

Access to the electronic media device may be controlled based on the determined attribute of the user operating the remote control. If a dad user and a son user are detected as being in an area proximate to an electronic media device, the electronic media device may allow access to particular content depending on which user is operating the remote control. For instance, the electronic media device may allow access to mature content if the dad user is detected as operating the remote control when the command to access the mature content was initiated, but prevent access to mature content if the son user is detected as operating the remote control when the command to access the mature content was initiated. Access to the electronic media device may be controlled based on the determined attribute using techniques similar to those described above with respect to numeral 540 shown in FIG. 5.

In some implementations, the electronic media device may implement a process to track and interpret hand gestures as commands, so that a user may control the electronic media device using hand gestures (e.g., as an alternative interface to using a remote control). Similar to a process to identify a particular user who is operating a remote control, a process to track and interpret hand gestures may associate a hand gesture to a particular user. For example, a process to track and interpret hand gestures may generate a position corresponding to the hand gesture, and compare the position of the hand gesture to positions of detected faces within a camera image to determine the particular user that is performing the hand gesture. The identity of the user performing the hand gesture may be determined and the command represented by the hand gesture may be associated with the identified user.

In other implementations, the electronic media device may implement a process to track and interpret spoken words as commands such that a user may control the electronic media device using voice (e.g., as an alternative interface to using a remote control or a hand gesture). Similar to a process to identify a particular user who is operating a remote control, a process to track and interpret spoken words may associate a voice command to a particular user. In some examples, a process to track and interpret spoken words may determine the identity of the speaker based on the sound of the voice. In these examples, a user identification process may determine if a user associated with the identity of the voice is present.

In some arrangements, the electronic media device may implement a process to detect mouth movements. Faces (e.g., detected by a user detection process) may be analyzed to find a mouth position and mouth pose. A user identification process may be performed for the user detected as moving their mouth and the command represented by the voice command may be associated with the identified user.

Figure 10:
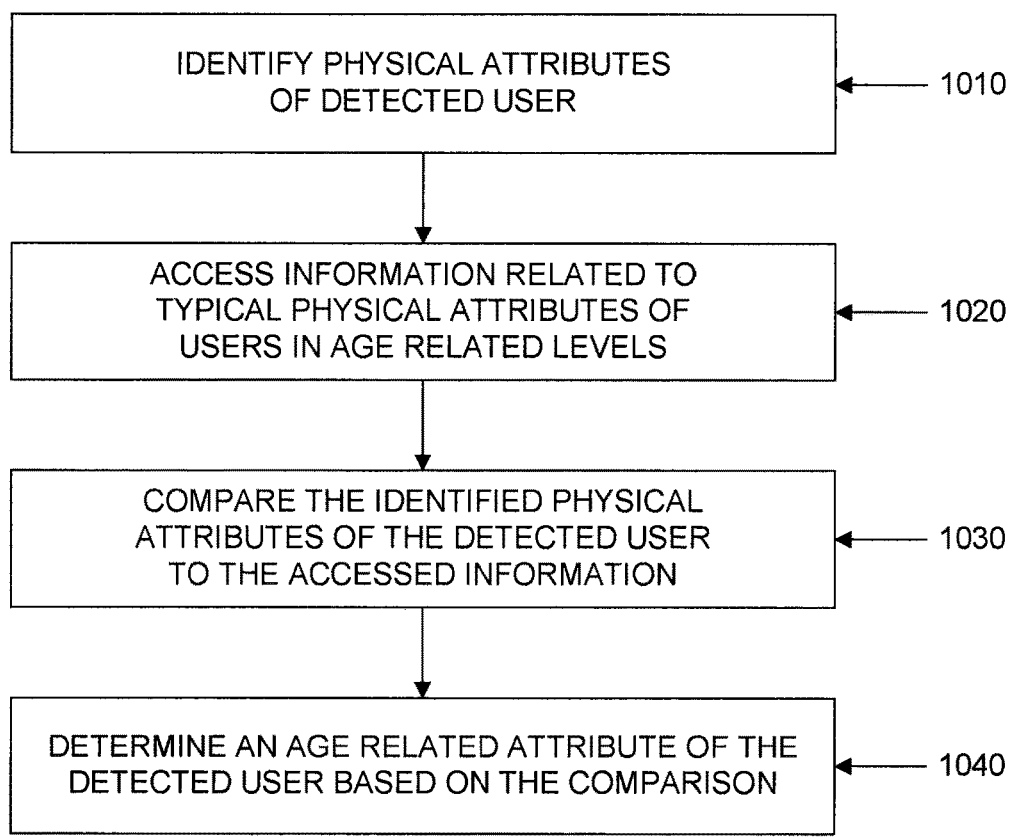

FIG. 10 illustrates a process 1000 for determining an age-related attribute of a detected user. For convenience, particular components described with respect to FIG. 2 are referenced as performing the process 1000. However, similar methodologies may be applied in other implementations where different components are used to define the structure of the system (e.g., components described with respect to FIG. 3), or where the functionality is distributed differently among the components. The process 1000 for determining an age-related attribute of a detected user may be used by the processor 205 in process 500 with respect to numeral 530.

The processor 205 identifies a physical attribute of a user detected in one or more images of users proximate to the electronic media device 200 (1010). The physical attribute may be a facial template of the detected user (e.g., a representation of the detected user's face) or a body template of the detected user (e.g., a representation of the detected user's face). The physical attribute also may include a facial feature ratio for the detected user, a size of the detected user, or other measurements of the detected user's body. The processor 205 may identify multiple physical attributes for the detected user and use the multiple physical attributes as a basis for determining an attribute of the detected user.

The processor 205 accesses information related to typical physical attributes of users in age-related levels (1020). The processor 205 may access the information related to typical physical attributes of users in age-related levels from the storage medium 202. The processor 205 also may receive the information related to typical physical attributes of users in age-related levels in electronic communications over a network or from another device.

FIG. 11 depicts an example of data 1100 related to typical physical attributes of users in age-related levels. The data 1100 includes an age-related level field 1101 and fields 1102-1104 that store a variety of data that may be used to identify an age-related level of a user based on physical attributes. The age-related level field 1101 stores data that identifies an age-related level. The age-related level field 1101 may store a specific age, an age range, a general age-related classification (e.g., child, adult, etc.), an appropriate content rating for users having the physical attributes (e.g., mature content user, PG content user, etc.), or any other type of information defining an age-related level.

The size field 1102 stores information related to a typical size of users in the age-related level identified in the age-related level field 1101. The size may be a size ratio of features of a user or may be a relative size of a user as compared to one or more background objects. In implementations in which captured images include depth measurements (e.g., time-of-flight cameras), the size may be an absolute size of a user at a particular depth, or multiple absolute sizes of a user at a variety of corresponding depths. The size information also may be a range of sizes of users typically included in that age-related level. The size information may be expressed as a number pixels, a size of an image covered by a user, real world measurements, or an estimated height or weight.

The facial feature ratio field 1103 stores a facial feature ratio information for typical users included in the age-related level identified in the age-related level field 1101. The facial feature ratio information may be used as part of an age classification process to determine an age-related level for a detected user. Specifically, the relative positions of a child's facial features change as the child grows, and analysis of facial feature ratio may enable classification of a person as a young child. The facial feature ratio information may be a range of potential values of facial feature ratios for typical users included in the age-related level.

The skin texture field 1104 stores skin texture information related to a typical smoothness of the skin of users included in the age-related level identified in the age-related level field 1101. The skin texture information may be used as part of an age classification process to determine an age-related level for a detected user because the skin texture may indicate presence or absence of wrinkles in a user's skin, thereby revealing an aspect of the user related to the user's age.

The data 1100 includes multiple example records 1105-1107, each being associated with a different age-related level. For instance, the record 1105 is associated with an age-related level of an adult user (e.g., users age 18 and above), the record 1106 is associated with an age-related level of a teen user (e.g., users age 13 to 18), and the record 1107 is associated with an age-related level of a child user (e.g., users age 12 and below). As shown, each of the records 1105-1107 has a different size attribute, a different facial feature ratio attribute, and a different skin texture attribute. Any of the these attributes, thus, may be used as a basis to identify to which age-related level a detected user belongs. However, in other examples, different age-related levels may have the same attribute value for a particular attribute and analysis of more than a single attribute may be needed to identify to which age-related level a detected user belongs.

Referring again to FIG. 10, the processor 205 compares the identified physical attribute of the detected user to the accessed information related to typical physical attributes of users in age-related levels (1030) and determines an age-related attribute of the detected user based on the comparison (1040). For example, the processor 205 may compare the identified physical attribute of the detected user to each of the data records 1105-1107 included in the data 1100 shown in FIG. 11.

If the identified physical attribute of the detected user is a facial feature ratio that corresponds to facial feature ratio range #3, the processor 205 determines that the identified physical attribute of the detected user matches the facial feature ratio attribute of record 1107, which is associated with the child user age-related level. In addition, if the identified physical attribute of the detected user is a size that corresponds to Size Range #1, the processor 205 determines that the identified physical attribute of the detected user matches the size attribute of record 1105, which is associated with the adult user age-related level. In another example, if the identified physical attributes of the detected user include a skin texture smoothness factor that corresponds to Smooth Factor #2 and a size that corresponds to Size Range #2, the processor 205 determines that the identified physical attributes of the detected user match the record 1106, which is associated with the teen user age-related level.

In the event that the processor 205 identifies multiple physical attributes and the multiple physical attributes do not correspond to a single record, the processor 205 may perform additional processing to determine the appropriate age-related level for the identified user. For instance, if the identified physical attributes of the detected user include a skin texture smoothness factor that corresponds to Smooth Factor #1 and a size that corresponds to Size Range #2, the processor 205 determines that the identified physical attributes of the detected user may match the record 1105 or may match the record 1106. The processor 205 then may determine the facial feature ratio of the detected user. If the facial feature ratio of the detected user corresponds to facial feature ratio range #1, the processor 205 determines that the identified physical attributes most closely match the record 1105, which is associated with the adult user age-related level. Alternatively, if the facial feature ratio of the detected user corresponds to facial feature ratio range #2, the processor 205 determines that the identified physical attributes most closely match the record 1106, which is associated with the teen user age-related level.

In other implementations, in the event that the processor 205 identifies multiple physical attributes and the multiple physical attributes do not correspond to a single record, the processor 205 may select the record with the lowest access privileges to ensure a user does not gain access privileges greater than those to which the user is entitled. In these implementations, if the identified physical attributes of the detected user include a skin texture smoothness factor that corresponds to Smooth Factor #1 and a size that corresponds to Size Range #2, the processor 205 applies the age-related level of record 1106 (i.e., teen user), even though the identified physical attributes of the detected user may match the record 1105 or may match the record 1106.

Figure 12:
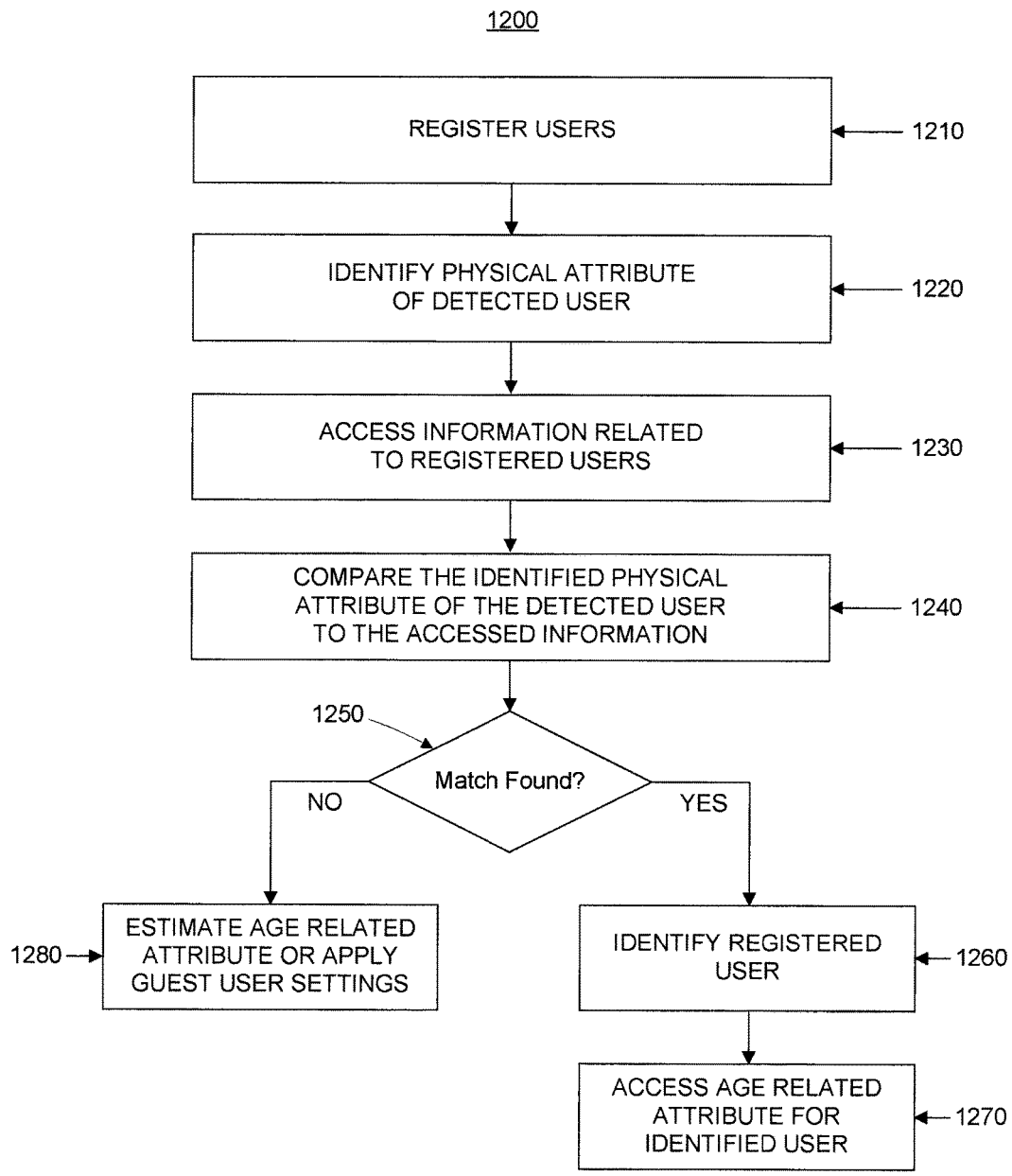

FIG. 12 illustrates a process 1200 for accessing personalized media settings for users of an electronic media device. For convenience, particular components described with respect to FIG. 2 are referenced as performing the process 1200. However, similar methodologies may be applied in other implementations where different components are used to define the structure of the system (e.g., components described with respect to FIG. 3), or where the functionality is distributed differently among the components.

The processor 205 registers one or more users of the electronic media device 200 (1210). Registering users may involve capturing images of a known user and storing the captured images for use in automatically identifying the known user in later processes, such as automatically controlling access to an electronic media device for the known user. The captured images may be stored directly or may be used as a basis for generating a template or other physical attribute data used in later identifying the known user.

For instance, the processor 205 may perform a configuration process to register users. In some examples, the device 200 provides a parent with the ability to register the faces of all members of a household including children, and set access control settings for each family member, or specific combinations of family members. The registered faces may be used to later identify the registered users using a facial recognition process.

A user may control the device 200 to begin the configuration/registration process. In some implementations, to ensure that unauthorized users do not change configuration settings, a user identification process may be performed on the user that began the configuration process. In these implementations, one or more images of the user that began the configuration process may be analyzed to determine whether the user that began the configuration process is authorized to change configuration settings.

Initially (e.g., prior to registration of any users), an unrecognized user may be allowed to start a configuration process. When an unrecognized user starts a configuration process, the processor 205 may analyze one or more images of the unrecognized user to determine an age-related attribute for the unrecognized user using an age classification process. The processor 205 may allow the unrecognized user to perform the configuration process if the age-related attribute indicates that the unrecognized user is above a particular age and may deny the unrecognized user from performing the configuration process if the age-related attribute indicates that the unrecognized user is below the particular age. Analyzing an age-related attribute of an unrecognized user when the unrecognized user initiates a configuration process may prevent a child user from being able to perform a configuration process and set access control rules for the child user that are inappropriate (e.g., set a rule that the child user is permitted to access mature or R-rated content).

When users are registered, some users may be tagged with administrator rights, such that a user with administrator rights may be permitted to perform the configuration process. After at least one user is given administrator rights, only recognized users with administrator rights may be allowed to perform the configuration process. Administrator rights may correspond to a designation of parent.

Upon entering a configuration process, a face detection process may automatically detect faces within a camera image. A user identification process compares detected faces (e.g., all detected faces) with data stored in the system (e.g., in non-volatile memory). Any users who are not identified are added to the system, thereby registering those users. In some examples, users may be identified, but the user's current appearance may be different than the stored representation of the user's appearance. In these examples, when the degree of similarity of the user's current appearance to the stored representation of the user's appearance is less than a threshold value, the stored representation of the user's appearance may be updated, so that the system adapts to gradual changes in a registered user's appearance (e.g., as a child grows).

During the configuration process, the processor may generate and store a model of a detected user in accordance to a user identification process. For example, in an implementation in which a user identification process identifies a user based on facial appearance, a sampling process may store a sample of a user's facial appearance. In an implementation in which a user identification process identifies a user based on body measurements, a sampling process may store a sample of a three dimensional human body model configuration. A sample may be stored in the storage medium 202 and later accessed by the processor 205 to identify registered users.

Figure 13:
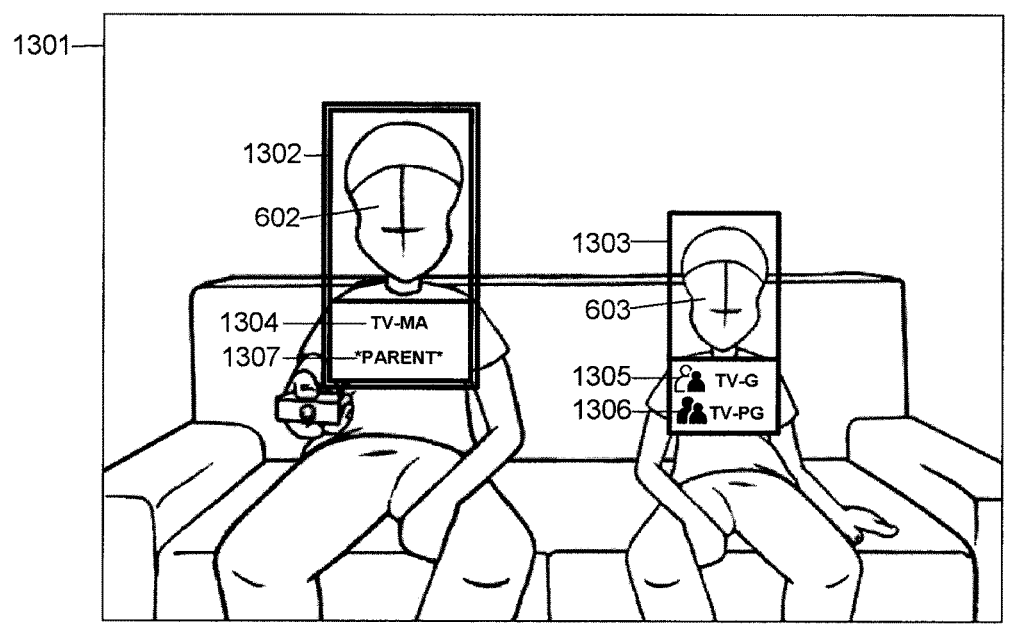
FIG. 13 illustrates an example interface for registering users and configuring user access privileges.

FIG. 13 illustrates an example interface for registering users and configuring user access privileges. As shown in FIG. 13, a configuration process may generate an image, which may be displayed on a display device. A display image 1301 may display each face (602 and 603) framed with a box (1302, 1303). Information may be displayed near each face. Information may include one or more ratings (1304, 1305, and 1306) and administrator rights status (1307).

In some implementations, a rating may further include a supervised rating (1306) and an unsupervised rating (1305). In these implementations, the supervised rating applies when a user with administrator rights (or other supervisory rights) is detected as being present, and the unsupervised rating applies when a user with administrator rights (or other supervisory rights) is detected as being absent. For instance, the ratings (1305, 1306) for the child user indicate that the child user may watch G rated television programming content alone, but requires supervision to watch PG rated television programming content. The absence of a mature rating for the child user may indicate that the child user is not permitted to watch mature television programming content even when supervised. Additionally, the system may display previously sampled face images and their associated ratings.

Figure 14:
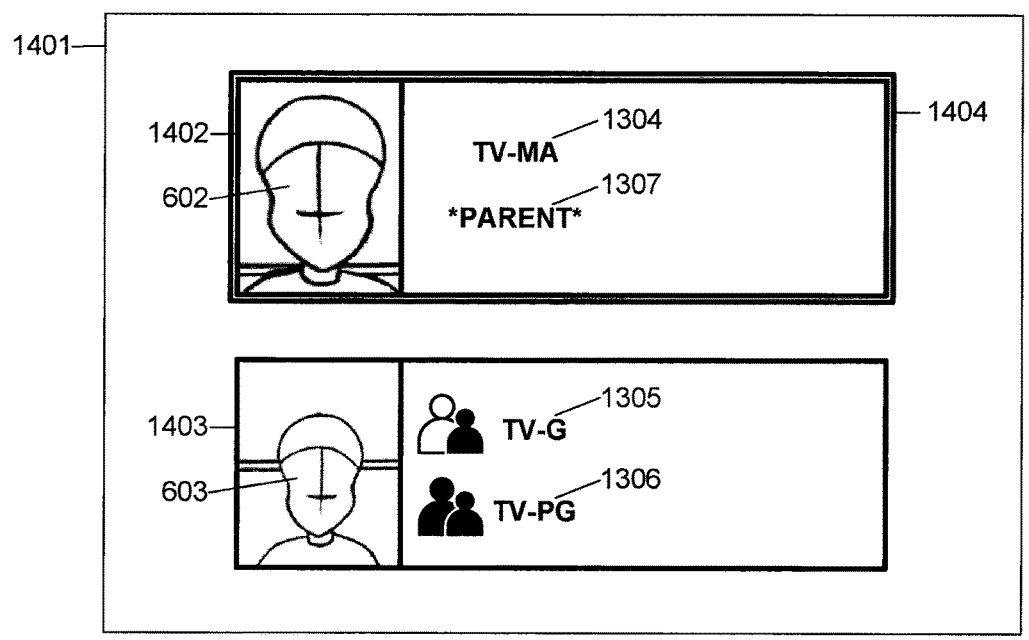
FIG. 14 illustrates another example interface for registering users and configuring user access privileges.

FIG. 14 illustrates another example interface for registering users and configuring user access privileges. A display image 1401 may display a cropped image of each face (602, 603) as a thumbnail photo (1402, 1403). Similar to the first example display image, one or more ratings (1304, 1305, and 1306) and an administrator rights status (1307) may be displayed for each face.

A configuration process may provide a mechanism that allows a user to select a face. A user may select a face using directional buttons of a remote control. A selected face may be indicated by the appearance of the image. For example, a box (1402), border (1404), or region may be a unique color or have a highlight appearance when the face associated with the image is selected. A user may select a face to set access control privileges for the user associated with the selected face. In some examples, a user may select a group of multiple faces and set access privileges for the group at one time.

A configuration process may provide a mechanism that allows a user to change a rating. A user may, for example, provide user input to cycle through a set of rating options. For convenience, a set of rating options may include common predefined combinations (e.g., TV Parental Guideline system designated by the Federal Communications Commission "TV-14", and the Motion Picture Association of America (MPAA) film rating "PG-13"). A default rating option may be automatically selected for newly registered users based on the estimated age of the user, as determined by an age classification process, thereby minimizing the number of button clicks needed to configure the system.

A configuration process also may provide a mechanism to define the behavior when an unrecognized user is detected. A rating option may be selected for each age group determined by an age classification process. For instance, groups may be defined as young child, older child, and adult and a different rating may be set for each group. A default rating option may be automatically selected for each age group. A user also may select specific channels to block for each user. The system further may be configured to block specific channels based on the age group.

The system also may be configured to block specific channels based on the user identity. The system further may be configured to block selected inputs for certain users (e.g., block an input in which a video game console is connected). An input allows the video output of an external device to be displayed on a display device. The system also may be configured to block particular functionality of a device for certain users (e.g., block the ability to record or erase a recorded program).

The processor 205 may allow an administrator user (e.g., parent or supervisory user) performing a configuration process to establish any of the above settings for other users for which the administrator user may set access control settings/rules. Alternatively, the processor 205 may allow the administrator user (e.g., parent or supervisory user) to establish any of the above settings for other users after a registration/configuration has occurred.

Referring again to FIG. 12, the processor 205 identifies a physical attribute of a user detected in one or more images of users proximate to the electronic media device 200 (1220). The physical attribute may be a facial template of the detected user (e.g., a representation of the detected user's face) or a body template of the detected user (e.g., a representation of the detected user's face). The physical attribute also may include a facial feature ratio for the detected user, a size of the detected user, a skin color attribute for the detected user, a skin texture attribute of the detected user, other measurements of the detected user's body, or an age-related attribute of the detected user. The processor 205 may identify multiple physical attributes for the detected user and use the multiple physical attributes as a basis for identifying the detected user.

The processor 205 accesses information related to registered users (1230). The processor 205 may access the information related to registered users from the storage medium 202. The processor 205 also may receive the information related to registered users in electronic communications over a network or from another device. The information related to registered users may be information obtained during the configuration/registration process described above with respect to numeral 1210.

FIG. 15 depicts an example of data 1500 stored for registered users. The data 1500 includes an identification field 1501 and fields 1502-1505 that store a variety of data that may be used to identify users based on physical attributes. The identification field 1501 stores data that identifies (perhaps, uniquely) a user by, for example, a user name. The identification field 1501 also may store information such as an ID number, or an actual name.

The size field 1502 stores information related to a size of the user identified in the identification field 1501. The size may be a size ratio of features of the user or may be a relative size of the user as compared to one or more background objects. In implementations in which captured images include depth measurements (e.g., time-of-flight cameras), the size may be an absolute size of the user at a particular depth, or multiple absolute sizes of the user at a variety of corresponding depths. The size information may be expressed as a number pixels, a size of an image covered by a user, real world measurements, or an estimated height or weight.

The facial template field 1503 stores a facial template for the user identified in the identification field 1501. The facial template may be used as part of a facial recognition process to identify users. The facial template may include an actual image of the user's face or may be a computational representation of the user's face that is based on an image of the user's face.

The body model field 1504 stores a body model for the user identified in the identification field 1501. The body model may be used as part of a body recognition process to identify users. The body model may include an actual image of the user's body or may be a computational representation of the user's body that is based on an image of the user's body.

The age field 1505 stores an age attribute for the user identified in the identification field 1501. The age attribute may be inputted by the user or may be an age attribute determined based on analysis of an image of the user. The processor 205 may access the age attribute after identifying a user as corresponding to a particular record in the data 1500. The age attribute may be used as a basis for controlling access to an electronic media device for the user.

The data 1500 includes multiple example records 1506-1510, each being associated with a different member of a family. For instance, the record 1506 is associated with a dad user, the record 1507 is associated with a mom user, the record 1508 is associated with a son user, the record 1509 is associated with a daughter user, and the record 1510 is associated with a dog user. As shown, each of the records 1506-1509 associated with human users has a different facial template attribute, a different body model attribute, and a different age attribute. Any of the these attributes, thus, may be used as a basis to uniquely identify which human user in the family is in an image of an area proximate to an electronic media device.

The size attributes of the records 1506-1509 associated with human users, on the other hand, overlap. For example, the mom user and the son user have the same size attribute (i.e., Size #2). Accordingly, detecting a user with a size attribute of Size #2 in an image of an area proximate to an electronic media device is not sufficient to uniquely identify the user and apply the proper access control settings. In this case, further analysis (e.g., comparison of a facial template or a body model) is needed to differentiate between the mom user and the son user. Alternatively, if a user with a size attribute of Size #1 is detected in an image of an area proximate to an electronic media device, the detection is sufficient to identify the user as the dad user because the dad user is the only registered user with the size attribute of Size #1.

The information for the dog user stored in the record 1510 may be used as an elimination reference to eliminate consideration of images of the dog detected in an area proximate to the electronic media device. When an object in an image is detected as being the dog based on the record 1510, the object is ignored and not used as a basis for controlling the electronic media device. The information for the dog user stored in the record 1510 does not include a facial template or an age attribute because either this information is inappropriate for identifying the dog or difficult to obtain for the dog.

Referring again to FIG. 12, the processor 205 compares the identified physical attribute of the detected user to the accessed information related to registered users (1240) and determines whether a match is found (1250). For example, the processor 205 may compare the identified physical attribute of the detected user to each of the data records 1506-1510 included in the data 1500 shown in FIG. 15. If the identified physical attribute of the detected user is a facial template that corresponds to facial template #3, the processor 205 determines that the identified physical attribute of the detected user matches the facial template attribute of record 1508, which is associated with the son user. In addition, if the identified physical attribute of the detected user is a size that corresponds to Size #3 and a body model that corresponds to body model #4, the processor 205 determines that the identified physical attribute of the detected user matches the record 1509, which is associated with the daughter user. Alternatively, if the identified physical attribute of the detected user is a size that corresponds to Size #3 and a body model that corresponds to body model #5, the processor 205 determines that the identified physical attribute of the detected user matches the record 1510, which is associated with the dog user and, therefore, ignored.

The processor 205 may determine that a match exists when the identified physical attribute of the detected user exactly or closely matches data included in the data 1500. When the identified physical attribute of the detected user does not exactly match data included in the data 1500, the processor 205 determines whether the data is close enough to a match to be reasonably certain that the detected user is a user associated with a record in the data 1500. Determining whether data is close enough to a match may involve determining a match when a difference between the data and the identified physical attribute is less than a threshold. Multiple attributes may be considered when determining whether a match is close enough and an aggregate of the differences between identified physical attributes and registered attributes may be used in the determination.

In the event that the processor 205 determines that a match exists, the processor 205 identifies the registered user (1260) and accesses an age-related attribute for the identified user (1270). For instance, the processor 205 may determine the matching data record (e.g., one of data records 1506-1509) and access user identification information (e.g., user identification information included in the identification field 1501) associated with the matching data record. The processor 205 then may use the accessed user identification information to access, from electronic storage (e.g., from storage medium 202), an age-related attribute for the registered user (e.g., the age attribute 1505).

In some implementations, the age-related attribute may be something other than an actual age or an age range. For instance, the age-related attribute may be a content rating setting (e.g., G, PG, MA, etc.) or other access control information that may reflect or be related to an age of a user.

In the event that the processor 205 determines that a match does not exist, the processor 205 estimates an age-related attribute for the detected user or accesses guest user or generic settings (1280). Estimating an age-related attribute for the detected user and applying access control based on the estimated age-related attribute may be performed using techniques similar to those described above with respect to FIG. 10.

The guest user or generic settings may be default settings for the electronic media device. An administrator user may choose default settings for the electronic media device or may allow the default settings to be the most restrictive settings of any registered user. Applying restrictive default settings may help ensure that a user is unable to access content that is inappropriate for the user.

Figure 16:
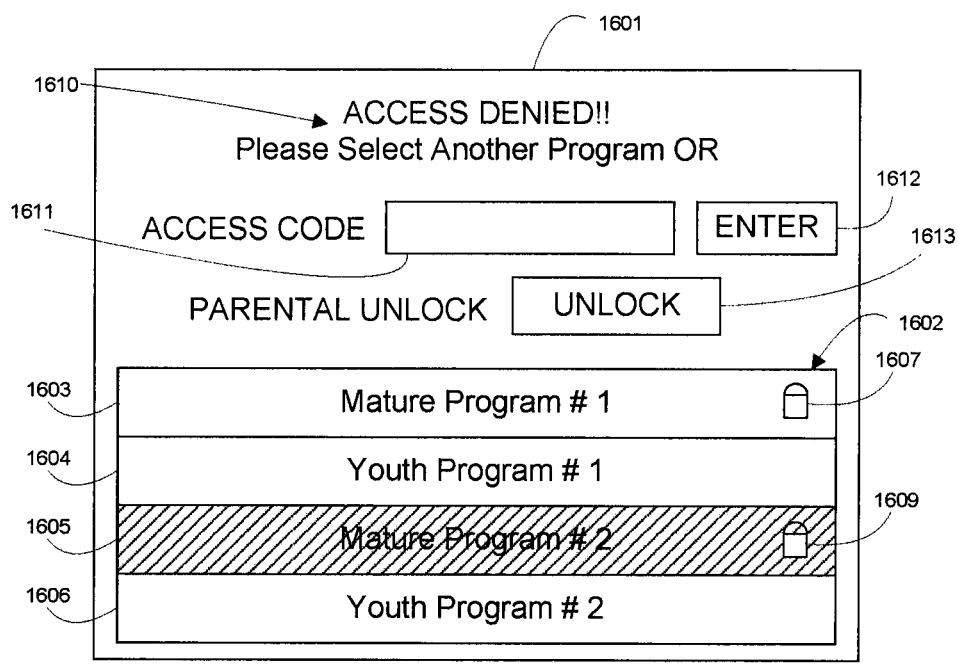
FIG. 16 illustrates an example user interface that may be displayed when controlling access to an electronic media device.

FIG. 16 illustrates an example user interface 1601 that may be displayed when controlling access to an electronic media device. For instance, the user interface 1601 may be displayed when controlling access to an electronic media device as described above with respect to numeral 540 in FIG. 5.

The user interface 1601 includes a content listing 1602 that includes four programs 1603-1606. The four program 1603-1606 include a variety of youth or child appropriate programs and mature or adult appropriate programs. The content listing 1602 may be a list of channels and corresponding programs broadcast by a content provider, the content listing 1602 may be a list of recorded programs, or the content listing 1602 may be a list of programs otherwise made available by a content provider. The content listing 1602 may be part of an electronic programming guide that controls a set top box, television, digital recorder, a receiver, or other type of electronic device.

The content listing 1602 includes locked icons 1607 and 1609 associated with programs 1603 and 1605, respectively. The locked icons 1607 and 1609 indicate that the programs 1603 and 1605 are currently locked based on the access control settings being applied (e.g., the user is prevented from accessing the programs 1603 and 1605). The locked icons 1607 and 1609 may be rendered in the content listing 1602 to indicate to the user that access control settings have been automatically applied, without human intervention. For example, the user may be automatically identified as a child user and access control settings for the child user may automatically be applied when the child user attempts to access content. In this example, the access control settings may prevent the child user from accessing mature programs and the locked icons 1607 and 1609 may be automatically displayed in the content listing 1602 to indicate to the child user that Mature Program #1 and Mature Program #2 are locked. In other implementations, rather than displaying locked icons when a child user is identified as using an electronic media device, mature programs may not be displayed in the content listing 1602 such that the child user is not made aware of the mature programs and the mature programs are not available for selection by the child user.

In the example shown in FIG. 16, the program 1605 (i.e., Mature Program #2) is shaded to indicate that the user has attempted to select the program 1605 (i.e., Mature Program #2). Because access control settings have been automatically applied (e.g., the user has been automatically identified as a child user), the "ACCESS DENIED!!" message 1610 is displayed in the user interface 1601 and access to the program 1605 (i.e., Mature Program #2) is automatically prevented. The "ACCESS DENIED!!" message 1610 alerts the user that the automatic access control of the electronic media device prevents the user from experiencing the content associated with the program 1605 (i.e., Mature Program #2) and indicates that, if the user wishes to experience content, the user may select another program.

The user interface 1601 may include a variety of mechanisms to enable the user to access the content locked by automatic access control of the electronic media device. As shown, the user interface 1601 includes an access code text box 1611 and an interface control element 1612. To override the automatic access control of the electronic media device, the user may enter an access code (e.g., a password) into the access code text box 1611 and activate the interface control element 1612. If the entered access code is valid, the electronic media device at least temporarily overrides the automatic access control of the electronic media device and allows access to the program 1605. If the entered access code is invalid, the electronic media device maintains the automatic access control of the electronic media device and prevents access to the program 1605.

By providing the user with the ability to enter an access code to unlock content that has been automatically locked, a supervisory user (e.g., a parent) has flexibility in applying access control for the electronic media device and provides the supervisory user a mechanism for granting the user permission to access content that otherwise would be locked. In some examples, the access code is specific to particular content such that the access code allows the user to access particular, locked content using the access code, but does not allow the user to access other locked content. The access code also may have a time limit associated with it such that it is valid for only a limited time. Placing a time limit on the access code may allow a supervisory user to give a user temporary permission to experience locked (e.g., mature) content without allowing the user to experience locked content on an unlimited basis. The access code unlocking mechanism also allows the supervisory user to give a user permission to access locked content from a location remote from the electronic media device.

The user interface 1601 also includes an unlock interface control element 1613 that allows a supervisory user to at least temporarily unlock content that was automatically locked (e.g., Mature Program #2). Invocation of the unlock interface control element 1613 initiates a verification process to verify that the user invoking the interface control element 1613 has authority to unlock the content for the user. The verification process may involve automatically, without human intervention, detecting the user invoking the unlock interface control element 1613 (e.g., the user operating the remote control when a command to invoke the interface control element 1613 is received) in one or more images of an area proximate to the electronic media device.

In response to detecting the user invoking the unlock interface control element 1613, the identity of the detected user may be determined based on the one or more images. The identity of the detected user is then used to determine whether the detected user is authorized to unlock the content for the user for which the content was initially locked (e.g., determine whether the detected user is a supervisory user, a parent, or an administrator user for the user for which the content was initially locked). If the detected user is authorized to unlock the content, the content is automatically unlocked. Alternatively, if the detected user is not authorized to unlock the content, the content remains locked.

In other examples, in response to detecting the user invoking the unlock interface control element 1613, an age-related attribute may be determined for the detected user using an age classification process. If the age-related attribute corresponds to an age that is greater than a threshold age, the detected user is allowed to unlock the content. If the age-related attribute corresponds to an age that is less than a threshold age, the detected user is prevented from unlocking the content. In these examples, adult users may be allowed to unlock content for child users, but teen and/or child users may be prevented from unlocking content for child users.

The unlock interface control element 1613, thus, provides a mechanism by which a supervisory user may automatically unlock content for a user supervised by the supervisory user. Because the identity or age of the user invoking the unlock interface control element 1613 is determined, circumvention of the automatic access control for the electronic media device may be adequately prevented, while allowing supervisory users a convenient mechanism for unlocking content that does not require knowledge and entry of a password.

FIG. 17 shows example access control rule data 1700 that may be used in automatically controlling access to an electronic media for identified users. For instance, the access control rule data 1700 may be accessed and used when controlling access to an electronic media device as described above with respect to numeral 540 in FIG. 5.

The access control rule data 1700 includes an identification field 1701 and fields 1702-1705 that store a variety of data that may be used in automatically controlling access to an electronic media device. The identification field 1701 may store data that identifies (perhaps, uniquely) a user to which the access control rule applies. The identification field 1701 may be used to determine an access control rule for a particular user when the particular user is identified. The identification field 1701 may store information such as a user name, an ID number, or an actual name.

The identification field 1701 also may store data that identifies a group of users to which the access control rule applies. For instance, the identification field 1701 may identify a group of users having a common age-related attribute and identify an access control rule that applies to all of the users included in the group of users.

The content allowed field 1702 stores information related to the type of content the user (or group of users) identified in the identification field 1701 is allowed to experience. For example, the content allowed field 1702 may store a rating of content the user identified in the identification field 1701 is allowed to experience. The content allowed field 1702 may store multiple ratings or other types of content the user is allowed to experience and the access control rule data 1700 may define different access control rule settings for each of the multiple ratings or other types of content. In some implementations, the content allowed field 1702 may store information identifying specific content (e.g., specific programs, specific channels, etc.) that the user identified in the identification field 1701 is allowed to experience or may store information identifying specific content (e.g., specific programs, specific channels, etc.) that the user identified in the identification field 1701 is not allowed to experience.

The time of day restriction field 1703 stores information related to a time of day associated with the access control rule. The time of day restriction field 1703 may define a range of hours within a day for which a particular access control rule applies. In this regard, access control rules may vary depending on the time of day the user is identified as attempting to experience content. The time of day restriction field 1703 may include information defining a particular time range using hours, minutes, and/or seconds or may include information defining a more general time range, such as morning, afternoon, evening, etc.

The day restriction field 1704 stores information related to a day associated with the access control rule. The day restriction field 1704 may define a day of the week or a particular date or date range for which a particular access control rule applies. In this regard, access control rules may vary depending on the day the user is identified as attempting to experience content. The time of day restriction field 1703 may include information defining a day or range of days of the week (e.g., Monday through Wednesday, Friday, the weekend, etc.), may include information defining a particular calendar date or range of calendar dates (e.g., March 31, May 12 through June 23, etc.), or may include information defining a more general day restriction range (e.g., Summer, Fall, school season, school breaks, etc.). In some implementations, a user's calendar may be used to identify events (e.g., school breaks or holidays) such that day restrictions may be assigned based on specific events, rather than actual calendar dates.

The supervisor field 1705 stores information related to one or more other users that are allowed to supervise the user (or group of users) identified in the identification field 1701 in using the electronic media device when supervision is required to experience content. The supervisor field 1705 may store information specifically identifying one or more particular supervisor users or may store information identifying an attribute (e.g., an age-related attribute) that a supervisor user needs to have in order to supervise the user (or group of users) identified in the identification field 1701.

In some examples, multiple supervisor users may be identified for a particular access control rule and the multiple supervisor users may have varying degrees of supervisory authority. For instance, a particular supervisor user only may be a valid supervisory user for particular content or when the content is being experienced at a particular time or on a particular day.

The data 1700 includes multiple example records 1706-1714, each being associated with a different user or group of users. For instance, the record 1706 is associated with a dad user, the record 1707 is associated with a mom user, the record 1708 is associated with a son user, the record 1709 is associated with a daughter user, the record 1710 is associated with a generic adult user, the record 1711 is associated with a generic teen user, the record 1712 is associated with a generic child user, the record 1713 is associated with a guest user, and the record 1714 is associated with a dog user. The multiple example records 1706-1714 include access control rule information for each user or group of users identified in the identification field 1701.

For instance, the record 1706 associated with the dad user and the record 1707 associated with the mom user include access control rule information indicating that the dad user and the mom user are allowed to experience all types of content, that the dad user and the mom user have no time of day or day restrictions on use of the electronic media device, and the dad user and the mom user have no supervisor users. Accordingly, when the dad user and mom user are detected (either alone or together) as using the electronic media device, they may use the electronic media device in an unlimited manner.

The record 1708 associated with the son user stores access control rules for two different types of content. Specifically, the son user is allowed to experience content rated PG-13 or below (e.g., PG, G, etc.) on any day of the week between the hours of 8 AM to 10 PM, and the son user is allowed to experience content rated R on Saturday and Sunday between the hours of 10 AM to 8 PM. The record 1708 also indicates that the dad user and the mom user are supervisor users for the son user. As such, the son user may be able to experience content that otherwise would be automatically restricted (e.g., R rated content on a Thursday or PG-13 rated content at 11 pm) when the son user is in the presence of one or both of the mom user and the dad user.

The record 1709 associated with the daughter user stores access control rules for three different types of content. Specifically, the daughter user is allowed to experience content rated PG-13 or above (e.g., R, etc.) only when supervised by the mom user and/or the dad user. The daughter user also is allowed to experience content rated PG on any day of the week between the hours of 8 AM to 8 PM without supervision or between the hours of 8 PM to 10 PM when supervised by the son user. The daughter user further is allowed to experience content rated G on Sunday to Thursday between the hours of 8 AM to 8 PM or on Friday and Saturday between the hours of 8 AM to 10 PM.

The record 1709 also indicates that the dad user and the mom user are supervisor users for the daughter user and that the son user is a limited supervisor user for the daughter user. Specifically, the dad user and the mom user may supervise the daughter user at any time for any type of content. On the other hand, the son user may supervise the daughter user only for PG rated content and only during the hours of 8 PM to 10 PM.

The record 1710 associated with a generic adult user stores a single access control rule for the group of generic adult users. A generic adult user is a user that is not specifically recognized by an automatic access control system, but is determined, by an age classification process, to have an age-related attribute that indicates that the user is an adult (e.g., older than 18 years of age). The record 1710 indicates that a generic adult user has no day restriction and no supervisor user. However, the record 1710 also indicates that a generic adult user only is allowed to experience content rated R or below during the hours of 6 AM and 11 PM. In this regard, additional restrictions may be placed on generic adult users that are not placed on known adult users (e.g., the dad user and mom user).

The record 1711 associated with a generic teen user stores a single access control rule for the group of generic teen users. A generic teen user is a user that is not specifically recognized by an automatic access control system, but is determined, by an age classification process, to have an age-related attribute that indicates that the user is a teen (e.g., between 13 and 18 years of age). The record 1711 indicates that a generic teen user is allowed to experience content rated PG-13 or below (e.g., PG, G, etc.) on any day of the week between the hours of 8 AM to 10 PM.

In addition, the record 1711 indicates that any adult user may supervise a generic teen user such that the generic teen user may be able to experience content that otherwise would be automatically restricted (e.g., R rated content or PG-13 rated content at 11 pm) when the generic teen user is in the presence of an adult user. The supervisory ability of the adult user may be limited based on the adult user's own access control rule information (e.g., an adult user cannot allow a generic teen user to experience content the adult user would not be allowed to experience). For instance, the dad user and the mom user may allow a generic teen user to experience any type of content at any time of the day. However, based on the record 1710, a generic adult user would not be able to allow a generic teen user to experience content rated above R (e.g., X, etc.) or allow the generic teen user to experience content at 2 AM.

The record 1712 associated with a generic child user stores a single access control rule for the group of generic child users. A generic child user is a user that is not specifically recognized by an automatic access control system, but is determined, by an age classification process, to have an age-related attribute that indicates that the user is a child (e.g., under 13 years of age). The record 1712 indicates that a generic child user is allowed to experience content rated G on any day of the week between the hours of 8 AM to 8 PM. The record 1712 indicates that a generic child user may be supervised by any adult user similar to a generic teen user.

The record 1713 associated with a guest user stores a single access control rule for the group of guest users. A guest user is a user that is not specifically recognized by an automatic access control system and that does not have an identified age-related attribute. The record 1713 indicates that a guest user is allowed to experience content rated PG or below on any day of the week between the hours of 8 AM to 8 PM. The record 1713 indicates that a guest user may be supervised by any adult user similar to a generic teen user and a generic child user.

The information for the dog user stored in the record 1714 indicates that the dog user is an elimination reference and that no additional access control restriction should be applied based on the presence of the dog user in an area proximate to the electronic device. When an object in an image is detected as being the dog, the object is ignored and not used as a basis for controlling access to the electronic media device.

Figure 18:
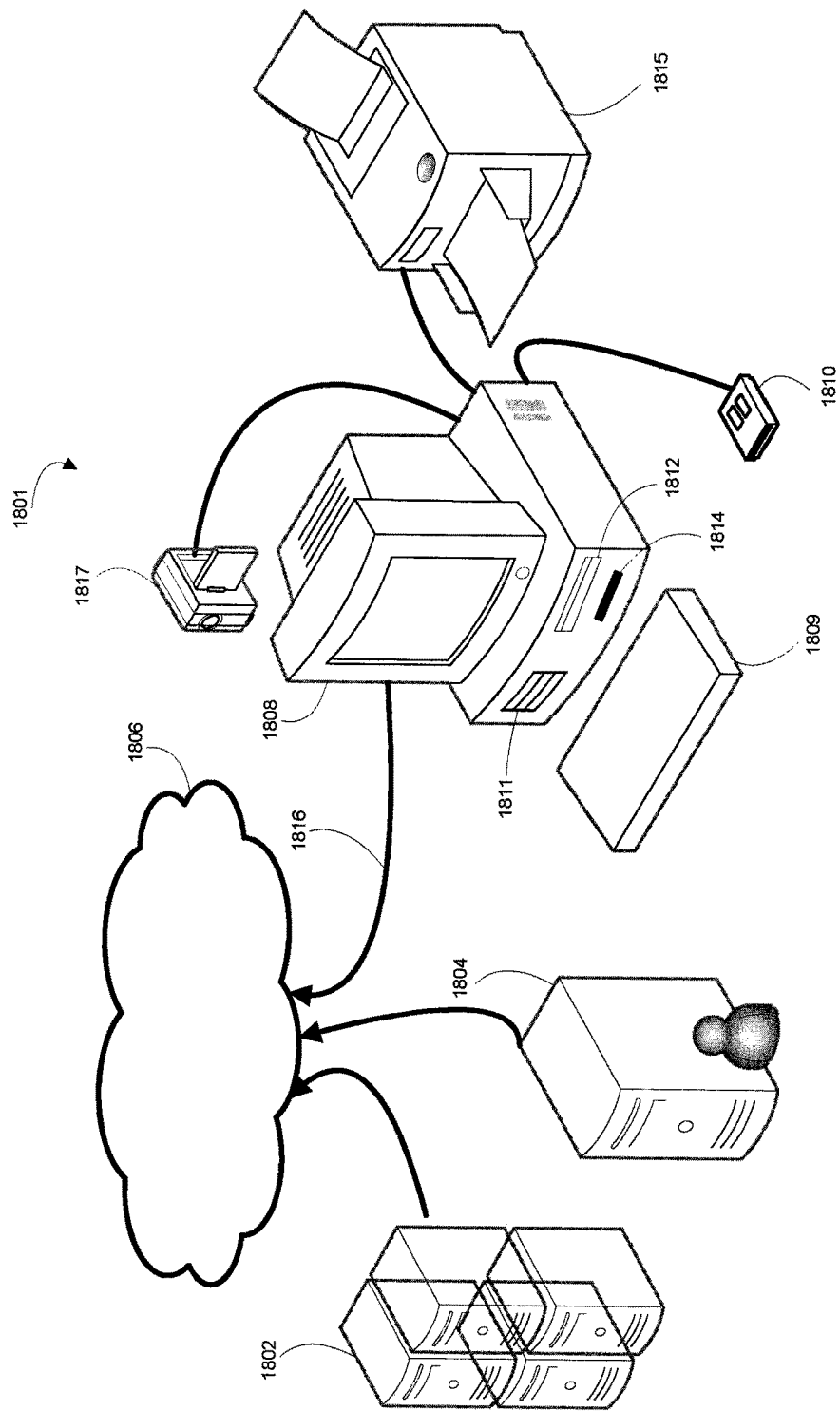
FIG. 18 illustrates components of an exemplary computer processing system.

FIG. 18 illustrates components of an exemplary computer processing system. Briefly, the system 1800 includes a computing device 1801 that includes a processor configured to control an application that is configured to control access and media preferences of content by identifying users. The device 1801 may be configured to exchange electronic communications over a network 1806 with one or more servers including a server 1802 and a server 1804.

In more detail, the hardware environment of the computing device 1801 includes a display monitor 1808 for displaying text and images to a user, a keyboard 1809 for entering text data and user commands into the computing device 1801, a mouse 1810 for pointing, selecting and manipulating objects displayed on the display monitor 1808, a fixed disk drive 1811, a removable disk drive 1812, a tape drive 1814, a hardcopy output device 1815, a computer network connection 1816, and a digital input device 1817.

The display monitor 1808 displays the graphics, images, and text that comprise the user interface for the software applications used by the computing device 1801, as well as the operating system programs necessary to operate the computing device 1801. A user uses the keyboard 1809 to enter commands and data to operate and control the computer operating system programs as well as the application programs. The mouse 1810 may be any type of pointing device, and may be a joystick, a trackball, a touch-pad, or other pointing device. Software used to display a user interface and enable a user to enter text, numbers, or select from a menu of options is stored locally on computer readable memory media, such as the fixed disk drive 1811.

In a further implementation, the fixed disk drive 1811 itself may include a number of physical drive units, such as a redundant array of independent disks ("RAID"), or may be a disk drive farm or a disk array that is physically located in a separate computing unit. Such computer readable memory media allow the computing device 1801 to access computer-executable process steps, application programs and the like, stored on removable and non-removable memory media.

The computer network connection 1816 may be a modem connection, a local-area network ("LAN") connection including the Ethernet, or a broadband wide-area network ("WAN") connection such as a digital subscriber line ("DSL"), cable high-speed internet connection, dial-up connection, T-1 line, T-3 line, fiber optic connection, or satellite connection. The network 1806 may be a LAN network, a corporate or government WAN network, the Internet, or other network.

The computer network connection 1816 may be a wireline or wireless connector. Example wireless connectors include, for example, an INFRARED DATA ASSOCIATION® ("IrDA®") wireless connector, an optical wireless connector, an INSTITUTE OF ELECTRICAL AND ELECTRONICS ENGINEERS® ("IEEE®") Standard 802.11 wireless connector, a BLUETOOTH® wireless connector, an orthogonal frequency division multiplexing ("OFDM") ultra wide band ("UWB") wireless connector, a time-modulated ultra wide band ("TM-UWB") wireless connector, or other wireless connector. Example wired connectors include, for example, a IEEE®-2894 FIREWIRE® connector, a Universal Serial Bus ("USB") connector, a serial port connector, a parallel port connector, or other wireline connector.

The removable disk drive 1812 is a removable storage device that is used to off-load data from the computing device 1801 or upload data onto the computing device 1801. The removable disk drive 1812 may be a floppy disk drive, an IOMEGA® ZIP® drive, a compact disk-read only memory ("CD-ROM") drive, a CD-Recordable drive ("CD-R"), a CD-Rewritable drive ("CD-RW"), flash memory, a USB flash drive, thumb drive, pen drive, key drive, a High-Density Digital Versatile Disc ("HD-DVD") optical disc drive, a Blu-Ray optical disc drive, a Holographic Digital Data Storage ("HDDS") optical disc drive, or any one of the various recordable or rewritable digital versatile disc ("DVD") drives such as the DVD-Recordable ("DVD-R" or "DVD+R"), DVD-Rewritable ("DVD-RW" or "DVD+RW"), or DVD-RAM. Operating system programs, applications, and various data files, are stored on disks, which are stored on the fixed disk drive 1811 or on removable media for the removable disk drive 1812.

The tape drive 1814 is a tape storage device that is used to off-load data from the computing device 1801 or to upload data onto the computing device 1801. The tape drive 1814 may be a quarter-inch cartridge ("QIC"), 4 mm digital audio tape ("DAT"), 8 mm digital linear tape ("DLT") drive, or other type of tape.

The hardcopy output device 1815 provides an output function for the operating system programs and applications. The hardcopy output device 1815 may be a printer or any output device that produces tangible output objects, including textual or image data or graphical representations of textual or image data. While the hardcopy output device 1815 is depicted as being directly connected to the computing device 1801, it need not be. For instance, the hardcopy output device may be connected to the computing device 1801 via a network interface, such as a wireline or wireless network.

Furthermore, although the computing device 1801 is described above as a desktop PC, in further implementations the computing device 1801 may be a laptop, a workstation, a midrange computer, a mainframe, an embedded system, telephone, a handheld or tablet computer, a PDA, or other type of computer.

Figure 19:
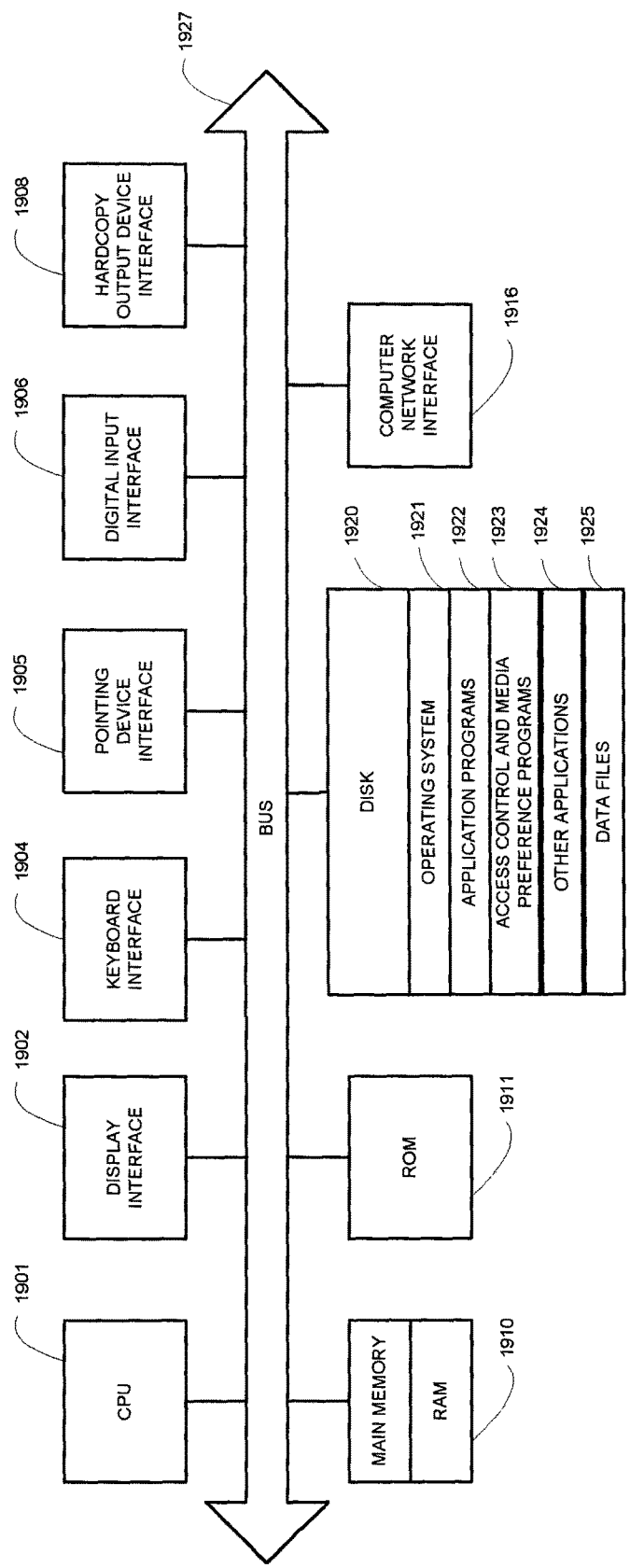
FIG. 19 is a block diagram illustrating the internal architecture of the computer shown in FIG. 18.

FIG. 19 is a block diagram illustrating the internal architecture of a computer shown in FIG. 18. An exemplary internal architecture of the computing device 1801 is now described. The computing environment includes a computer central processing unit ("CPU") 1901, where the computer instructions that comprise an operating system or an application are processed; a display interface 1902 which provides a communication interface and processing functions for rendering graphics, images, and texts on the display monitor 1808; a keyboard interface 1904 which provides a communication interface to the keyboard 1809; a pointing device interface 1905 which provides a communication interface to the mouse 1810 or an equivalent pointing device; a digital input interface 1906 which provides a communication interface to the digital input device 1817; a hardcopy output device interface 1908 which provides a communication interface to the hardcopy output device 1815; a random access memory ("RAM") 1910 where computer instructions and data are stored in a volatile memory device for processing by the computer CPU 1901; a read-only memory ("ROM") 1911 where invariant low-level systems code or data for basic system functions such as basic input and output ("I/O"), startup, or reception of keystrokes from the keyboard 1809 are stored in a non-volatile memory device; and a storage 1920 or other suitable type of memory (e.g., such as random-access memory ("RAM"), read-only memory ("ROM"), programmable read-only memory ("PROM"), erasable programmable read-only memory ("EPROM"), electrically erasable programmable read-only memory ("EEPROM"), magnetic disks, optical disks, floppy disks, hard disks, removable cartridges, flash drives), where the files that comprise an operating system 1921, application programs 1922 (including the access control and media preference programs 1923, and other applications 1924 as necessary) and data files 1925 are stored; a computer network interface 1916 which provides a communication interface to the network 1806 over the computer network connection 1816. The constituent devices and the computer CPU 1901 communicate with each other over the computer bus 1927.

The RAM 1910 interfaces with the computer bus 1927 so as to provide quick RAM storage to the computer CPU 1901 during the execution of software programs such as the operating system application programs, and device drivers. More specifically, the computer CPU 1901 loads computer-executable process steps from the fixed disk drive 1811 or other memory media into a field of the RAM 1910 in order to execute software programs. Data is stored in the RAM 1910, where the data is accessed by the computer CPU 1901 during execution.

The computing device 1801 stores computer-executable code for an operating system 1921, application programs 1922 such as word processing, spreadsheet, presentation, gaming, or other applications. Although it is possible to display a user interface and enable a user to enter text, numbers, or select from a menu of options using the above-described implementation, it is also possible to implement the functions according to the present disclosure as a dynamic link library ("DLL"), or as a plug-in to other application programs such as an Internet web-browser such as the MICROSOFT® Internet Explorer web browser.

The computer CPU 1901 is one of a number of high-performance computer processors, including an INTEL® or AMD® processor, a POWERPC® processor, a MIPS® reduced instruction set computer ("RISC") processor, a SPARC® processor, an ACORN® RISC Machine ("ARM®") architecture processor, a HP ALPHASERVER® processor or a proprietary computer processor for a mainframe. In an additional arrangement, the computer CPU 1901 is more than one processing unit, including a multiple CPU configuration found in high-performance workstations and servers, or a multiple scalable processing unit found in mainframes.

The operating system 1921 may be MICROSOFT® WINDOWS NT®/WINDOWS® 2000/WINDOWS® XP Workstation; WINDOWS NT®/WINDOWS® 2000/WINDOWS® XP Server; a variety of UNIX®-flavored operating systems, including AIX® for IBM® workstations and servers, SUNOS® for SUN® workstations and servers, LINUX® for INTEL® CPU-based workstations and servers, HP UX WORKLOAD MANAGER® for HP® workstations and servers, IRIX® for SGI® workstations and servers, VAX/VMS for Digital Equipment Corporation computers, OPENVMS® for HP ALPHASERVER®-based computers, MAC OS® X for POWERPC® based workstations and servers; SYMBIAN OS®, WINDOWS MOBILE® or WINDOWS CE®, PALM®, NOKIA® OS ("NOS"), OSE®, or EPOC® for mobile devices, or a proprietary operating system for computers or embedded systems. The application development platform or framework for the operating system 1921 may be: BINARY RUNTIME ENVIRONMENT FOR WIRELESS® ("BREW®"); Java Platform, Micro Edition ("Java ME") or Java 2 Platform, Micro Edition ("J2ME®"); PYTHON™, FLASH LITE®, or MICROSOFT®.NET Compact.

While FIGS. 18 and 19 illustrate one possible implementation of a computing device that executes program code, or program or process steps, configured to effectuate control of an application that is configured to enable a user to enter text, numbers, or select from a menu of options, other types of computers also may be used as well.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
   accessing one or more images of multiple users in an area in which an electronic media device is located;
   detecting a position of a remote control in the one or more images;
   determining a position of each of the multiple users based on the one or more images;
   comparing the position of the remote control to the position of each of the multiple users;
   identifying a user closest to the position of the remote control based on the comparison;
   determining an age-related level of the user closest to the position of the remote control;
   accessing media settings appropriate for the user based on the determined age-related level of the user; and
   controlling access to the electronic media device based on the accessed media settings appropriate for the user.

2. The computer-implemented method of claim 1, further comprising:
   determining multiple physical attributes of the user, wherein the multiple physical attributes include at least a facial attribute of the user and a non-facial attribute of the user;
   accessing three or more age-related levels, wherein the three or more age-related levels are associated with different age ranges of users, wherein the different age ranges are associated with one or more categories of physical attributes, the one or more categories of physical attributes including at least one or more of a size range of a user, a facial feature ratio range of a user, or a skin texture of a user;
   comparing the determined multiple physical attributes of the user to sets of physical attributes for the three or more age-related levels;
   determining that at least the facial attribute and the non-facial attribute match a set of physical attributes associated with a matched age-related level;
   determining, without relying on preregistered age information unique to the user, the age-related level of the user as the matched age-related level based on the determined match.

3. The computer-implemented method of claim 2, further comprising:
   receiving, at the electronic media device, a user input command; and
   capturing one or more images of the area in which the electronic media device is located in response to receiving the user input command, wherein the multiple physical attributes of the user are determined based on the one or more captured images.

4. The computer-implemented method of claim 2, wherein controlling access to the electronic media device based on the accessed media settings appropriate for the user includes preventing the electronic media device from turning on based on the determined multiple physical attribute of the detected user.

5. The computer-implemented method of claim 2, wherein controlling access to the electronic media device based on the accessed media settings appropriate for the user includes preventing the electronic media device from playing particular content.

6. The computer-implemented method of claim 5, wherein preventing the electronic media device from playing particular content includes at least one of preventing the user from tuning the electronic media device to a particular television channel based on a rating of television content being offered over the particular television channel, and preventing the user from playing a particular recording using the electronic media device based on a rating of content included in the particular recording.

7. The computer-implemented method of claim 2, further comprising:
   determining a gender attribute, wherein accessing media settings appropriate for the user based on the determined age-related level of the user includes accessing media settings appropriate for a user with the gender attribute.

8. The computer-implemented method of claim 1, wherein detecting the position of the remote control in the one or more images includes detecting presence of infrared light in a first of the one or more images and detecting absence of infrared light in a second of the one or more images.

9. The computer-implemented method of claim 1, wherein the user closest to the position of the remote control is determined to be using the remote control.

10. The computer-implemented method of claim 1, wherein access to the electronic media device is controlled without using attributes of the multiple users other than the user closest to the position of the remote control.

11. The computer-implemented method of claim 1, further comprising:
receiving a user input command provided by the user closest to the position of the remote control, wherein the user input command includes a request to access particular content using the electronic media device; and
wherein controlling access to the electronic media device based on the accessed media settings appropriate for the user closest to the position of the remote control includes:
determining that the user closest to the position of the remote control is prevented from accessing the particular content using the electronic media device without supervision of another user with an age-related level that is different than an age-related level of the user closest to the position of the remote control and that is equal to or greater than a particular age-related level;
determining an age-related level of at least one of the multiple users other than the user closest to the position of the remote control based on the accessed one or more images;
determining whether the age-related level of the at least one of the multiple users is equal to or greater than the particular age-related level; and
determining whether to control the electronic media device to access the particular content based on whether the age-related level of the at least one of the multiple users other than the user closest to the position of the remote control is equal to or greater than the particular age-related level.

12. The computer-implemented method of claim 1, further comprising:
receiving a user input command from the user to perform a particular operation;
accessing a control rule associated with performing the particular operation, the control rule defining an appropriate age-related level associated with performing the particular operation;
comparing the determined age-related level of the user to the appropriate age-related level associated with performing the particular operation;
determining whether the particular operation is appropriate for the user based on the comparison of the determined age-related level of the user to the appropriate age-related level associated with performing the particular operation; and
determining whether to perform the particular operation based on whether the particular operation is determined to be appropriate for the user.

13. The computer-implemented method of claim 2, further comprising:
wherein the determined multiple physical attributes of the user include at least one or more of a size of the user, a facial feature ratio of the user, and a skin texture attribute of the user;
wherein accessing the three or more age-related levels includes accessing information related to at least one or more of size ranges, facial feature ratio ranges, or skin textures of users having ranges of ages associated with the three or more age-related levels; and
wherein comparing the determined multiple physical attributes of the user to sets of physical attributes for the three or more age-related levels includes comparing at least one or more of the size of the user, the facial feature ratio of the user, or the skin texture attribute of the user to the accessed information related to at least one or more of the size ranges, the facial feature ratio ranges, or the skin textures of users having ranges of ages associated with the three or more age-related levels.

14. The computer-implemented method of claim 2, wherein determining the multiple physical attributes of the user detected within the image of the area in which an electronic media device is located includes:
registering one or more users, registering the one or more users including:
capturing one or more images of each of the one or more users;
identifying multiple physical attributes of each of the one or more users based on the one or more captured images of each of the one or more users;
receiving attribute information associated with each of the one or more users; and
storing, in electronic storage, the received attribute information in association with the identified multiple physical attributes of the one or more users corresponding to the received attribute information;
identifying multiple physical attributes of the user based on the image;
accessing, from electronic storage, registration information related to the one or more registered users, the registration information including, for each of the one or more registered users, attribute information stored in association with multiple physical attributes;
comparing the identified multiple physical attributes of the user to the accessed registration information;
based on the comparison, determining whether the identified multiple physical attributes of the user match multiple physical attributes included in the registration information; and
in response to determining that the identified one or more physical attributes of the user match multiple physical attributes included in the registration information, accessing, from the registration information, attribute information corresponding to the matched multiple physical attributes.

15. The computer-implemented method of claim 14, wherein:
identifying multiple physical attributes of the user based on the image includes identifying one or more body attributes of the user; and
the comparing and determining are part of a body recognition process based on the one or more body attributes of the user.

16. The computer-implemented method of claim 14, wherein:
identifying multiple physical attributes of the user based on the image includes identifying one or more facial attributes of the user; and
the comparing and determining are part of a facial recognition process based on the one or more facial attributes of the user.

17. The computer-implemented method of claim 14, wherein determining the multiple physical attributes of the user detected within the image of the area in which an electronic media device is located further includes:

in response to determining that the identified multiple physical attributes of the user do not match any of the multiple physical attributes included in the registration information, estimating an attribute for the user by comparing the identified multiple physical attributes of the user to typical physical attributes of users in one or more age-related levels.

18. The computer-implemented method of claim 2, further comprising:

determining multiple attributes for each of the multiple users; and determining the media settings appropriate for the user based on the determined attributes for each of the multiple users.

19. The computer-implemented method of claim 18, wherein determining the media settings appropriate for the user based on the determined attributes for each of the multiple users includes:

identifying, from among the determined attributes for each of the multiple users, the attribute that corresponds to the youngest age; and determining media settings appropriate for the user based on the attribute that corresponds to the youngest age.

20. The computer-implemented method of claim 18, wherein determining the media settings appropriate for the user based on the determined attributes for each of the multiple users includes:

receiving a user input command to access a particular type of content;

determining that a first user of the multiple users requires supervision to access the particular type of content;

accessing one or more physical attributes associated with users allowed to supervise the first user in accessing the particular type of content;

comparing one or more physical attributes of the multiple users other than the first user to the accessed one or more physical attributes associated with users allowed to supervise the first user in accessing the particular type of content;

based on the comparison, determining whether at least one of the multiple users other than the first user is allowed to supervise the first user in accessing the particular type of content;

conditioned on determining that at least one of the multiple users other than the first user is allowed to supervise the first user in accessing the particular type of content, accessing the particular type of content; and conditioned on determining that none of the multiple users other than the first user is allowed to supervise the first user in accessing the particular type of content, preventing access to the particular type of content.

21. The computer-implemented method of claim 18, further comprising:

determining that one or more physical attributes of one of the multiple users corresponds to an elimination reference, the elimination reference defining physical attributes of a registered moving object so that the moving object does not impact access control, wherein detecting multiple users includes eliminating the one of the multiple users that corresponds to the elimination reference from the multiple users.

22. The computer-implemented method of claim 1, wherein controlling access to the electronic media device based on the accessed media settings appropriate for the user includes:

receiving a user input command to access a particular type of content;

initially preventing access to the particular type of content;

allowing a supervisory user to enable access to the particular type of content by providing an unlock command to the electronic media device;

receiving, at the electronic media device, the unlock command;

in response to receiving the unlock command, accessing one or more images of an unlocking user providing the unlock command;

detecting the unlocking user in the one or more images of the unlocking user providing the unlock command;

identifying one or more physical attributes of the unlocking user based on the one or more images of the unlocking user providing the unlock command;

accessing one or more physical attributes of the supervisory user allowed to enable access to the particular type of content;

comparing the identified one or more physical attributes of the unlocking user to the accessed one or more physical attributes of the supervisory user;

based on the comparison, determining whether the unlocking user is the supervisory user;

conditioned on determining that the unlocking user is the supervisory user, allowing access to the particular type of content; and conditioned on determining that the unlocking user is not the supervisory user, maintaining prevention of access to the particular type of content.

23. The computer-implemented method of claim 1, further comprising:

detecting, based on an image of the area, a user entering the area in which the electronic media device is located, wherein controlling access to the electronic media device based on the accessed media settings appropriate for the user includes blocking, without human intervention, content being outputted by the electronic media device in response to detecting the user entering the area proximate to the electronic media device.

24. A system comprising:

a camera configured to capture images of an area in which an electronic media device is located;

a processor configured to perform operations comprising:

accessing one or more images of multiple users in the area in which the electronic media device is located;

detecting a position of a remote control in the one or more images;

determining a position of each of the multiple users based on the one or more images;

comparing the position of the remote control to the position of each of the multiple users;

identifying a user closest to the position of the remote control based on the comparison;

determining, an age-related level of the user closest to the position of the remote control;

accessing media settings appropriate for the user based on the determined age-related level of the user; and controlling access to the electronic media device based on the accessed media settings appropriate for the user.

25. A non-transitory computer readable storage medium having embodied thereon a computer program, the computer program comprising instructions for:
  accessing one or more images of multiple users in an area in which an electronic media device is located;
  detecting a position of a remote control in the one or more images;
  determining a position of each of the multiple users based on the one or more images;
  comparing the position of the remote control to the position of each of the multiple users;
  identifying a user closest to the position of the remote control based on the comparison;
  determining, an age-related level of the user closest to the position of the remote control;
  accessing media settings appropriate for the user based on the determined age-related level of the user; and
  controlling access to the electronic media device based on the accessed media settings appropriate for the user.

26. A system comprising:
  means for accessing one or more images of multiple users in an area in which an electronic media device is located;
  means for detecting a position of a remote control in the one or more images;
  means for determining a position of each of the multiple users based on the one or more images;
  means for comparing the position of the remote control to the position of each of the multiple users;
  means for identifying a user closest to the position of the remote control based on the comparison;
  means for determining, an age-related level of the user closest to the position of the remote control;
  means for accessing media settings appropriate for the user based on the determined age-related level of the user; and
  means for controlling access to the electronic media device based on the accessed media settings appropriate for the user.

27. The computer-implemented method of claim 1, wherein the accessing the media settings appropriate for the user based on the determined age-related level of the user is based on an estimated age of the user and disregards ages of the remaining users of the multiple users.

* * * * *